US012334093B2

(12) United States Patent
Liang

(10) Patent No.: US 12,334,093 B2
(45) Date of Patent: Jun. 17, 2025

(54) AUDIO DATA PROCESSING METHOD AND APPARATUS, DEVICE, AND MEDIUM

(71) Applicant: Tencent Technology (Shenzhen) Company Limited, Shenzhen (CN)

(72) Inventor: Junbin Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 202 days.

(21) Appl. No.: 18/137,332

(22) Filed: Apr. 20, 2023

(65) Prior Publication Data

US 2023/0260527 A1 Aug. 17, 2023

Related U.S. Application Data

(63) Continuation of application No. PCT/CN2022/113179, filed on Aug. 18, 2022.

(30) Foreign Application Priority Data

Sep. 3, 2021 (CN) ........................ 202111032206.9

(51) Int. Cl.
*G10L 21/0224* (2013.01)
*G10L 21/0208* (2013.01)
*G10L 21/0232* (2013.01)

(52) U.S. Cl.
CPC ...... *G10L 21/0224* (2013.01); *G10L 21/0232* (2013.01); *G10L 2021/02085* (2013.01)

(58) Field of Classification Search
CPC ............. G10L 21/0224; G10L 21/0232; G10L 2021/02085; G10L 21/0216; G10L 25/30; G10L 25/54; G10L 21/0208
See application file for complete search history.

(56) References Cited

U.S. PATENT DOCUMENTS

| | | | |
|---|---|---|---|
| 9,947,333 | B1 | 4/2018 | David |
| 2007/0131094 | A1 | 6/2007 | Kemp |

(Continued)

FOREIGN PATENT DOCUMENTS

| | | | |
|---|---|---|---|
| CN | 106024005 A | | 10/2016 |
| CN | 206686334 U | * | 11/2017 |

(Continued)

OTHER PUBLICATIONS

Rafii, Z., & Pardo, B. (May 2013). Online REPET-SIM for real-time speech enhancement. In 2013 IEEE International Conference on Acoustics, Speech and Signal Processing (pp. 848-852). IEEE.). (Year: 2013).*

(Continued)

*Primary Examiner* — Bhavesh M Mehta
*Assistant Examiner* — Philip H Lam
(74) *Attorney, Agent, or Firm* — Morgan, Lewis & Bockius LLP

(57) ABSTRACT

Embodiments of this application provide an audio data processing method performed by a computer device. The method includes the following steps: acquiring recorded audio; determining prototype audio matching a background reference audio component of the recorded audio from an audio database; extracting candidate speech audio from the recorded audio according to the prototype audio; determining a difference between the recorded audio and the candidate speech audio as the background reference audio component comprised in the recorded audio; performing environmental noise reduction on the candidate speech audio to obtain noise-reduced speech audio corresponding to the candidate speech audio; and combining the noise-reduced speech audio with the background reference audio component to obtain noise-reduced recorded audio.

14 Claims, 12 Drawing Sheets

(56) References Cited

U.S. PATENT DOCUMENTS

| | | | | |
|---|---|---|---|---|
| 2013/0070093 | A1* | 3/2013 | Rivera | G10H 1/365 348/143 |
| 2016/0284346 | A1* | 9/2016 | Visser | G10L 25/30 |
| 2017/0092288 | A1* | 3/2017 | Dewasurendra | H04R 1/08 |
| 2017/0140745 | A1* | 5/2017 | Nayak | H04L 65/1089 |
| 2018/0330707 | A1* | 11/2018 | Zhu | G10H 1/366 |
| 2019/0080177 | A1* | 3/2019 | Xu | G06V 10/462 |
| 2019/0138263 | A1* | 5/2019 | Kong | G10H 1/361 |
| 2021/0185437 | A1* | 6/2021 | Hou | G10L 25/18 |
| 2023/0171337 | A1* | 6/2023 | Yang | H04W 4/80 455/569.1 |

FOREIGN PATENT DOCUMENTS

| | | | | | |
|---|---|---|---|---|---|
| CN | 108140399 | A | | 6/2018 | |
| CN | 110675886 | A | | 1/2020 | |
| CN | 110808063 | A | | 2/2020 | |
| CN | 111046226 | A | | 4/2020 | |
| CN | 111128214 | A | * | 5/2020 | G10L 21/0208 |
| CN | 111524530 | A | | 8/2020 | |
| CN | 113257283 | A | | 8/2021 | |
| KR | 20190066640 | A | * | 6/2019 | |
| WO | WO-2019042459 | A1 | * | 3/2019 | H04R 1/1083 |

OTHER PUBLICATIONS

Burute, H. P., Patil, M., Chaudhari, K., & Mane, D. P. B. (2015). Comparative Study of Filter Performance for Separation of Singing Voice from Music Accompaniment. International Journal of Innovative Research in. (Year: 2015).*

Tencent Technology, ISR, PCT/CN2022/113179, Nov. 24, 2022, 3 pgs.

Tencent Technology, Extended European Search Report, EP Patent Application No. 22863157.8, Sep. 9, 2024, 9 pgs.

Laure Prétet, "Supervised Singing Voice Separation: Designing a Data Pipeline for Supervised Learning", Master Thesis, Aug. 2018, 56 pgs., Retrieved from the Internet: http://www.atiam.ircam.fr/Archives/Stages1718/PRETET_Laure_Memoire_Stage.pdf.

Zafar Rafii et al., "An Overview of Lead and Accompaniment Separation in Music", IEEE/ACM Transactions on Audio, Speech, and Language Processing, vol. 26, Issue 8, DOI: 10.1109/TASLP.2018.2825440, Aug. 2018, 30 pgs.

Tencent Technology, WO, PCT/CN2022/113179, Nov. 24, 2022, 4 pgs.

Tencent Technology, IPRP, PCT/CN2022/113179, Mar. 5, 2024, 5 pgs.

* cited by examiner

AUDIO DATA PROCESSING METHOD AND APPARATUS, DEVICE, AND MEDIUM

CROSS-REFERENCE TO RELATED APPLICATIONS

This application is a continuation application of PCT Patent Application No. PCT/CN2022/113179, entitled "AUDIO DATA PROCESSING METHOD AND APPARATUS, DEVICE, AND MEDIUM" filed on Aug. 18, 2022, which claims priority to Chinese Patent Application No. 202111032206.9, entitled "AUDIO DATA PROCESSING METHOD AND APPARATUS, DEVICE, AND MEDIUM" filed with the China National Intellectual Property Administration on Sep. 3, 2021, the entirety of which is incorporated by reference in its entirety.

FIELD OF THE TECHNOLOGY

This application relates to the technical field of audio processing, and in particular, to an audio data processing method and apparatus, device, and medium.

BACKGROUND OF THE DISCLOSURE

With the rapid promotion and popularity of audio and video service applications, users are using audio service applications to share daily music recordings more and more frequently. For example, when a user is listening to an accompaniment and singing, and recording the sound through a device with a recording function (such as a mobile phone and a sound card device connected with a microphone), the user may be in a noisy environment or the device used is too simple, which results in that a music recording signal recorded by the device may include not only the user's singing sound (a human voice signal) and the accompaniment (a music signal), but also a noise signal in the noisy environment, an electronic noise signal in the device, and the like. If the unprocessed music recording signal is shared directly to an audio service application, it is difficult for other users to hear the user's singing sound clearly when playing the music recording signal in the audio service application. Therefore, it is necessary to perform noise reduction on the recorded music recording signal.

Current noise reduction algorithms need to specify a noise type and a signal type. For example, based on the fact that human voice and noise have a certain feature distance from signal correlation and frequency spectrum distribution features, noise suppression is performed by some statistical noise reduction or deep learning noise reduction methods. However, music recording signals correspond to many types of music (such as classical music, folk music, and rock music), some types of music are similar to some types of environmental noise, or some music frequency spectrum features are relatively similar to some noise. When noise reduction is performed on music recording signals by the foregoing noise reduction algorithms, the music signals may be misinterpreted as noise signals for suppression, or noise signals may be misinterpreted as music signals for preservation, resulting in an unsatisfactory noise reduction effect on the music recording signals.

SUMMARY

Embodiments of this application provide an audio data processing method and apparatus, a device, and a medium, which can improve a noise reduction effect on recorded audio.

In an aspect, the embodiments of this application provide an audio data processing method performed by a computer device and the method including:

acquiring recorded audio;

determining prototype audio matching a background reference audio component of the recorded audio from an audio database;

extracting candidate speech audio from the recorded audio according to the prototype audio;

determining a difference between the recorded audio and the candidate speech audio as the background reference audio component comprised in the recorded audio;

performing environmental noise reduction on the candidate speech audio to obtain noise-reduced speech audio corresponding to the candidate speech audio; and combining the noise-reduced speech audio with the background reference audio component to obtain noise-reduced recorded audio.

In an aspect, the embodiments of this application provide a computer device, which includes a memory and a processor. The memory is connected to the processor, the memory is configured to store a computer program that, when executed by the processor, causes the computer device to perform the method according to the foregoing aspect of the embodiments of this application.

In an aspect, the embodiments of this application provide a non-transitory computer-readable storage medium, which stores a computer program therein. The computer program is adapted to be loaded and executed by a processor of a computer device and causing the computer device including the processor to perform the method according to the foregoing aspect of the embodiments of this application.

In an aspect, the embodiments of this application provide a computer program product or computer program, which includes computer instructions. The computer instructions are stored in a computer-readable storage medium. A processor of a computer device reads the computer instructions from the computer-readable storage medium, and executes the computer instructions to cause the computer device to perform the method according to the foregoing aspect.

According to the embodiments of this application, recorded audio including a background reference audio component, a speech audio component, and an environmental noise component may be acquired, prototype audio matching the recorded audio is acquired from an audio database, and then candidate speech audio may be acquired from the recorded audio according to the prototype audio, the candidate speech audio including the speech audio component and the environmental noise component. In this way, noise reduction for the recorded audio can be converted into noise reduction for the candidate speech audio, and then environmental noise reduction is directly performed on the candidate speech audio to obtain noise-reduced speech audio corresponding to the candidate speech audio, so as to avoid the confusion between the background reference audio component and the environmental noise component in the recorded audio. Because a difference between the recorded audio and the candidate speech audio is the background reference audio component, noise-reduced recorded audio may be obtained by combining the noise-reduced speech audio with the background reference audio component. It can be seen that by converting noise reduction for recorded audio into noise reduction for candidate speech audio, this application can avoid the confusion between a background reference audio component and an environmental noise component in the recorded audio, so as to improve a noise reduction effect on the recorded audio.

BRIEF DESCRIPTION OF THE DRAWINGS

In order to describe the technical solutions in the embodiments of this application or the prior art more clearly, the drawings need to be used in the description of the embodiments or the prior art will be briefly introduced below. Obviously, the drawings in the following description are only some embodiments of this application, and those of ordinary skill in the art may obtain other drawings according to these drawings without involving any inventive effort.

DESCRIPTION OF EMBODIMENTS

The technical solutions in the embodiments of this application will be clearly and completely described below with reference to the drawings in the embodiments of this application. Obviously, the described embodiments are only some but not all of the embodiments of this application. All other embodiments obtained by those of ordinary skill in the art based on the embodiments of this application without involving any inventive effort shall fall within the scope of protection of this application.

The solutions provided in the embodiments of this application relate to an artificial intelligence (AI) noise reduction service in AI cloud services. In the embodiments of this application, the AI noise reduction service may be accessed by means of an application program interface (API), and noise reduction is performed on recoding audio shared to a social networking system (such as a music recording sharing application) through the AI noise reduction service to improve a noise reduction effect on the recorded audio.

Figure 1:
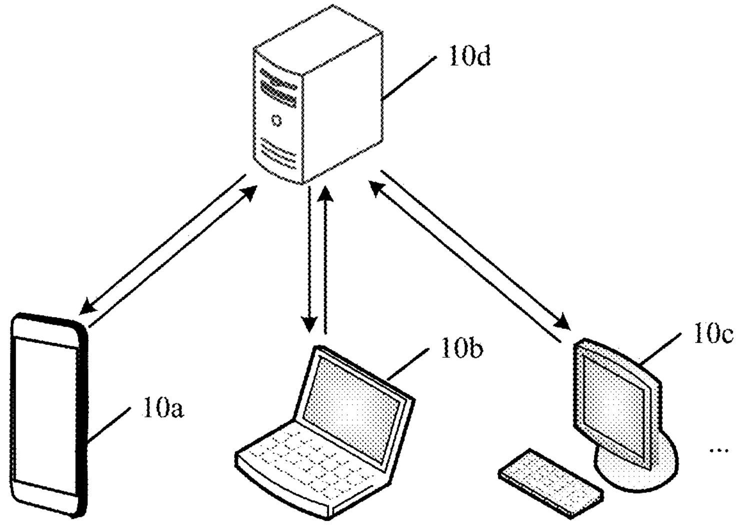
FIG. 1 is a schematic structural diagram of a network architecture according to an embodiment of this application.

Referring to FIG. 1, FIG. 1 is a schematic structural diagram of a network architecture according to an embodiment of this application. As shown in FIG. 1, the network architecture may include a server 10*d* and a user terminal cluster, the user terminal cluster may include one or more user terminals, and the number of user terminals is not defined herein. As shown in FIG. 1, the user terminal cluster may specifically include a user terminal 10*a*, a user terminal 10*b*, a user terminal 10*c*, and the like. The server 10*d* may be an independent physical server, may also be a server cluster or distributed system composed of a plurality of physical servers, and may also be a cloud server providing a basic cloud computing service such as a cloud service, a cloud database, cloud computing, a cloud function, cloud storage, a network service, cloud communication, a middleware service, a domain name service, a security service, a content delivery network (CDN), and a big data and AI platform. All of the user terminal 10*a*, the user terminal 10*b*, the user terminal 10*c*, and the like may include, but are not limited to: an intelligent terminal with a recording function such as a smart phone, a tablet computer, a notebook computer, a palmtop computer, a mobile Internet device (MID), a wearable device (such as a smart watch and a smart bracelet), and a smart television, a sound card device connected with a microphone, and the like. As shown in FIG. 1, the user terminal 10*a*, the user terminal 10*b*, the user terminal 10*c*, and the like may be respectively connected to the server 10*d* through a network, so that each user terminal may perform data interaction with the server 10*d* through the network connection.

The user terminal 10*a* shown in FIG. 1 is taken as an example, the user terminal 10*a* may be integrated with a recording function. In a case that a user wants to record audio data of himself/herself or others, he/she may use an audio playback device to play background reference audio (the background reference audio here may be a music accompaniment, or background audio and subtitle dubbing audio in a video, and the like), and start the recording function in the user terminal 10*a* to record mixed audio including the background reference audio played by the foregoing audio playback device. In this application, the mixed audio may be referred to as recorded audio, and the background reference audio may serve as a background reference audio component in the foregoing recorded audio. In a case that the user terminal 10*a* has an audio playback function, the foregoing audio playback device may be the user terminal 10*a* itself; or, the audio playback device may also be a device with an audio playback function other than the user terminal 10*a*. The foregoing recorded audio may be mixed audio including the background reference audio played by the audio playback device, environmental noise in an environment where the audio playback device/user is located, and user speech. The recorded background reference audio may serve as a background reference audio component in the recorded audio, the recorded environmental noise may serve as an environmental noise component in the recorded audio, and the recorded user speech may serve as a speech audio component in the recorded audio. The user terminal 10*a* may upload the recorded audio to a social networking system. For example, in a case that the user terminal 10*a* is installed with a client of a social networking system, the user terminal 10*a* may upload the recorded audio to the client of the social networking system, and the client of the social networking system may transmit the recorded audio to a backend server (such as the server 10*d* shown in FIG. 1) of the social networking system.

Because environmental noise may be recorded, the recorded audio includes an environmental noise component. Therefore, the backend server of the social networking system needs to perform noise reduction on the recorded audio. A process of noise reduction for the recorded audio may be as follows: prototype audio (the prototype audio here may be understood as official genuine audio corresponding to the background reference audio component in the recorded audio) matching the recorded audio is acquired from an audio database; candidate speech audio (including the foregoing environmental noise and the foregoing user speech) may be acquired from the recorded audio based on the prototype audio, and then a difference between the recorded audio and the candidate speech audio may be determined as the background reference audio component; and noise reduction is performed on the candidate speech audio to obtain noise-reduced speech audio corresponding to the candidate speech audio, and the noise-reduced speech audio and the background reference audio component are superimposed to obtain noise-reduced recorded audio. In this case, the noise-reduced recorded audio may be shared in the social networking system. By converting noise reduction for recorded audio into noise reduction for candidate speech audio, a noise reduction effect on the recorded audio can be improved.

Figure 2:
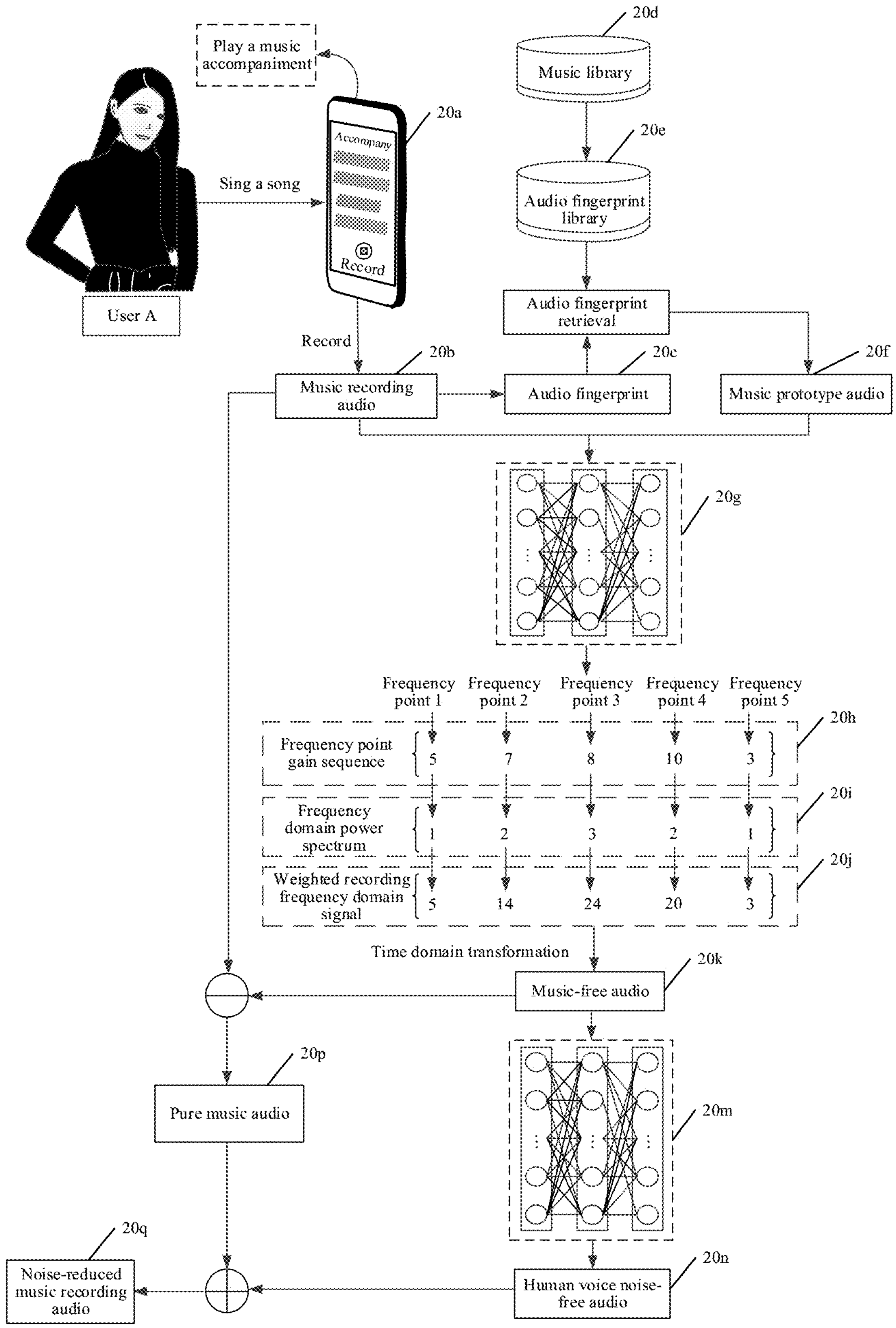
FIG. 2 is a schematic diagram of a noise reduction scene for a music recorded audio according to an embodiment of this application.

Referring to FIG. 2, FIG. 2 is a schematic diagram of a noise reduction scene for a music recorded audio according to an embodiment of this application. A user terminal 20*a* shown in FIG. 2 may be a terminal device (such as any user terminal in the user terminal cluster shown in FIG. 1) owned by a user A. The user terminal 20*a* is integrated with a recording function and an audio playback function, so the user terminal 20*a* may serve as both a recording device and an audio playback device. In a case that the user A wants to record music sung by himself/herself, he/she may start the recording function in the user terminal 20*a*, sing a song in the background of a music accompaniment played by the user terminal 20*a*, and record music. After the recording is completed, music recorded audio 20*b* can be obtained. In this case, the recorded audio of the embodiments of this application is the music recorded audio 20*b*, and the music recorded audio 20*b* may include the singing sound (that is, the speech audio component) of the user A and the music accompaniment (that is, the background reference audio component) played by the user terminal 20*a*. The user terminal 20*a* may upload the recorded music recorded audio 20*b* to a client corresponding to a music application, and after acquiring the music recorded audio 20*b*, the client transmits the music recorded audio 20*b* to a backend server (such as the server 10*d* shown in FIG. 1) corresponding to the music application, so that the backend server stores and shares the music recorded audio 20*b*.

In an actual music recording scene, the user A may be in a noisy environment. Therefore, the music recorded audio 20*b* recorded by the foregoing user terminal 20*a* may include environmental noise in addition to the singing sound of the user A and the music accompaniment played by the user terminal 20*a*, that is, the music recorded audio 20*b* may include three audio components: the environmental noise, the music accompaniment, and the user's singing sound. If the user A is on a street, the environmental noise in the music recorded audio 20*b* recorded by the user terminal 20*a* may be the whistling sound of a vehicle, the shouting sound of a roadside store, the speaking sound of a passerby, or the like. Of course, the environmental noise in the music recorded audio 20*b* may also include electronic noise. In a case that the backend server directly shares the music recorded audio 20*b* uploaded by the user terminal 20*a*, other terminal devices cannot hear the music recorded by the user A clearly when accessing the music application and playing the music recorded audio 20*a*. Therefore, it is necessary to perform noise reduction on the music recorded audio 20*b* before the music recorded audio 20*b* is shared in the music application, and then noise-reduced music recorded audio is shared, so that other terminal devices may play the noise-reduced music recorded audio when accessing the music application to learn the real singing level of the user A. In other words, the user terminal 20*a* is only responsible for collection and uploading of the music recorded audio 20*b*, and the backend server corresponding to the music application may perform noise reduction on the music recorded audio 20*b*. In a possible implementation, after collecting the music recorded audio 20*b*, the user terminal 20*a* may perform noise reduction on the music recorded audio 20*b*, and upload noise-reduced music recorded audio to the music application. After receiving the noise-reduced music recorded audio, the backend server corresponding to the music application may directly share the noise-reduced music recorded audio, that is, the user terminal 20*a* may perform noise reduction on the music recorded audio 20*b*.

A process of noise reduction for the music recorded audio 20*b* will be described below by taking the backend server (such as the foregoing server 10*d*) of the music application as an example. The nature of noise reduction for the music recorded audio 20*b* is to suppress the environmental noise in the music recorded audio 20*b* and to preserve the music accompaniment and the singing sound of the user A in the music recorded audio 20*b*. In other words, noise reduction for the music recorded audio 20*b* is to removing the environmental noise from the music recording music 20*b* as much as possible, but it is necessary to keep the music accompaniment and the singing sound of the user A in the music recorded audio 20*b* unchanged as much as possible.

As shown in FIG. 2, after acquiring the music recorded audio 20*b*, the backend server (such as the foregoing server 10*d*) of the music application may perform frequency domain transformation on the music recorded audio 20*b*, that is, the music recorded audio 20*b* is transformed from a time domain to a frequency domain to obtain a frequency domain power spectrum corresponding to the music recorded audio 20*b*. The frequency domain power spectrum may include energy values respectively corresponding to frequency points. The frequency domain power spectrum may be shown as a frequency domain power spectrum 20*i* in FIG. 2, one energy value in the frequency domain power spectrum 20*i* corresponds to one frequency point, and one frequency point is a frequency sampling point.

An audio fingerprint 20*c* (that is, an audio fingerprint to be matched) corresponding to the music recorded audio 20*b* may be extracted according to the frequency domain power spectrum corresponding to the music recorded audio 20*b*. The audio fingerprint may refer to unique digital features of a piece of audio in the form of identifiers. The backend server may acquire a music library 20*d* from the music application and an audio fingerprint library 20*e* corresponding to the music library 20*d*. The music library 20*d* may include all music audio stored in the music application, and the audio fingerprint library 20*e* may include audio fingerprints respectively corresponding to each piece of music audio in the music library 20*d*. Then, audio fingerprint retrieval may be performed in the audio fingerprint library 20*e* according to the audio fingerprint 20*c* corresponding to the music recorded audio 20*b* to obtain a fingerprint retrieval result (that is, an audio fingerprint, matching the audio fingerprint 20*b*, in the audio fingerprint library 20*e*) corresponding to the audio fingerprint 20*c*, and music prototype audio 20*f* (such as a music prototype corresponding to the music accompaniment in the music recorded audio 20*b*, that is, prototype audio) matching the music recorded audio 20*b* may be determined from the music library 20*d* according to the fingerprint retrieval result. Similarly, frequency domain transformation may be performed on the music prototype audio 20*f*, that is, the music prototype audio 20*f* is transformed from a time domain to a frequency domain to obtain a frequency domain power spectrum corresponding to the music prototype audio 20*f*.

Feature combination is performed on the frequency domain power spectrum corresponding to the music recorded audio 20*b* and the frequency domain power spectrum corresponding to the music prototype music 20*f*, a combined frequency domain power spectrum is inputted into a first-order deep network model 20*g*, and a frequency point gain is outputted through the first-order deep network model 20*g*. The first-order deep network model 20*g* may be a pre-trained network model capable of removing music from music recorded audio, and a process of training of the first-order deep network model 20*g* may refer to a process described in S304 below. A weighted recording frequency domain signal is obtained by multiplying the frequency point gain outputted by the first-order deep network model 20*g* by the frequency domain power spectrum corresponding to the music recorded audio 20*b*, and time domain transformation is performed on the weighted recording frequency domain signal, that is, the weighted recording frequency domain signal is transformed from a frequency domain to a time domain to obtain music-free audio 20*k*. The music-free audio 20*k* here may refer to an audio signal obtained by filtering out the music accompaniment from the music recorded audio 20*b*.

As shown in FIG. 2, if the frequency point gain outputted by the first-order deep network model 20*g* is a frequency point gain sequence 20*h*, the frequency point gain sequence 20*h* includes speech gains respectively corresponding to five frequency points: a speech gain 5 corresponding to a frequency point 1, a speech gain 7 corresponding to a frequency point 2, a speech gain 8 corresponding to a frequency point 3, a speech gain 10 corresponding to a frequency point 4, and a speech gain 3 corresponding to a frequency point 5. If the frequency domain power spectrum corresponding to the music recorded audio 20*b* is the frequency domain power spectrum 20*i*, the frequency domain power spectrum 20*i* includes energy values respectively corresponding to the foregoing five frequency points: an energy value 1 corresponding to the frequency point 1, an energy value 2 corresponding to the frequency point 2, an energy value 3 corresponding to the frequency point 3, an energy value 2 corresponding to the frequency point 4, and an energy value 1 corresponding to the frequency point 5. A weighted recording frequency domain signal 20*j* is obtained by calculating a product of the speech gain of each frequency point in the frequency point gain sequence 20*h* and the energy value corresponding to the same frequency point in the frequency domain power spectrum 20*i*. A specific calculation process is as follows: a product of the speech gain 5 corresponding to the frequency point 1 in the frequency point gain sequence 20*h* and the energy value 1 corresponding to the frequency point 1 in the frequency domain power spectrum 20*i* is calculated to obtain a weighted energy value 5, and the weighted energy value 5 is an energy value 5 for the frequency point 1 in the weighted recording frequency domain signal 20*j*; a product of the speech gain 7 corresponding to the frequency point 2 in the frequency point gain sequence 20*h* and the energy value 2 corresponding to the frequency point 2 in the frequency domain power spectrum 20*i* is calculated to obtain an energy value 14 for the frequency point 2 in the weighted recording frequency domain signal 20*j*; a product of the speech gain 8 corresponding to the frequency point 3 in the frequency point gain sequence 20*h* and the energy value 3 corresponding to the frequency point 3 in the frequency domain power spectrum 20*i* is calculated to obtain an energy value 24 for the frequency point 3 in the weighted recording frequency domain signal 20*j*; a product of the speech gain 10 corresponding to the frequency point 4 in the frequency point gain sequence 20*h* and the energy value 2 corresponding to the frequency point 4 in the frequency domain power spectrum 20*i* is calculated to obtain an energy value 20 for the frequency point 4 in the weighted recording frequency domain signal 20*j*; and a product of the speech gain 3 corresponding to the frequency point 5 in the frequency point gain sequence 20*h* and the energy value 1 corresponding to the frequency point 5 in the frequency domain power spectrum 20*i* is calculated to obtain an energy value 3 for the frequency point 5 in the weighted recording frequency domain signal 20*j*. The music-free audio 20*k* (that is, the candidate speech audio) may be obtained by performing time domain transformation on the weighted recording frequency domain signal 20*j*, and the music-free audio 20*k* may include two components: the environmental noise and the user's singing sound.

After obtaining the music-free audio 20*k*, the backend server may determine a difference between the music recorded audio 20*b* and the music-free audio 20*k* as pure music audio 20*p* (that is, the background reference audio component) included in the music recorded audio 20*b*. The pure music audio 20*p* here may be the music accompaniment played by the music playback device. Meanwhile, frequency domain transformation may also be performed on the music-free audio 20*k* to obtain a frequency domain power spectrum corresponding to the music-free audio 20*k*, the frequency domain power spectrum corresponding to the music-free audio 20*k* is inputted into a second-order deep network model 20*m*, and a frequency point gain corresponding to the music-free audio 20*k* is outputted through the second-order deep network model 20*m*. The second-order deep network model 20*m* may be a pre-trained network model capable of performing noise reduction on noise-carrying speech audio, and a process of training of the second-order speech network model 20*m* may refer to a process described in S305 below. A weighted speech frequency domain signal is obtained by multiplying the frequency point gain outputted by the second-order deep network model 20*m* by the frequency domain power spectrum corresponding to the music-free audio 20*k*, and time domain transformation is performed on the weighted speech frequency domain signal to obtain human voice noise-free audio 20*n* (that is, the noise-reduced speech audio). The human voice noise-free audio 20*n* may refer to an audio signal obtained by performing noise suppression on the music-free audio 20*k*, such as the singing sound of the user A in the music recorded audio 20*b*. The foregoing first-order deep network model 20*g* and second-order deep network model 20*m* may be deep networks having different network structures. A process of calculation of the human voice noise-free audio 20*n* is similar to the foregoing process of calculation of the music-free audio 20*k*, which will not be described in detail here.

The backend server may superimpose the pure music audio 20*p* and the human voice noise-free audio 20*n* to obtain noise-reduced music recorded audio 20*q* (that is, the noise-reduced recorded audio). By separating the pure music audio 20*q* from the music recorded audio 20*b*, noise reduction for the music recorded audio 20*b* is converted into noise reduction for the music-free audio 20*k* (which may be understood as human voice audio), so that the noise-reduced music recorded audio 20*q* can not only preserve the singing sound of the user A and the music accompaniment, but also suppress the environmental noise in the music recorded audio 20*b* to the maximum extent, thereby improving a noise reduction effect on the music recorded audio 20*b*.

Figure 3:
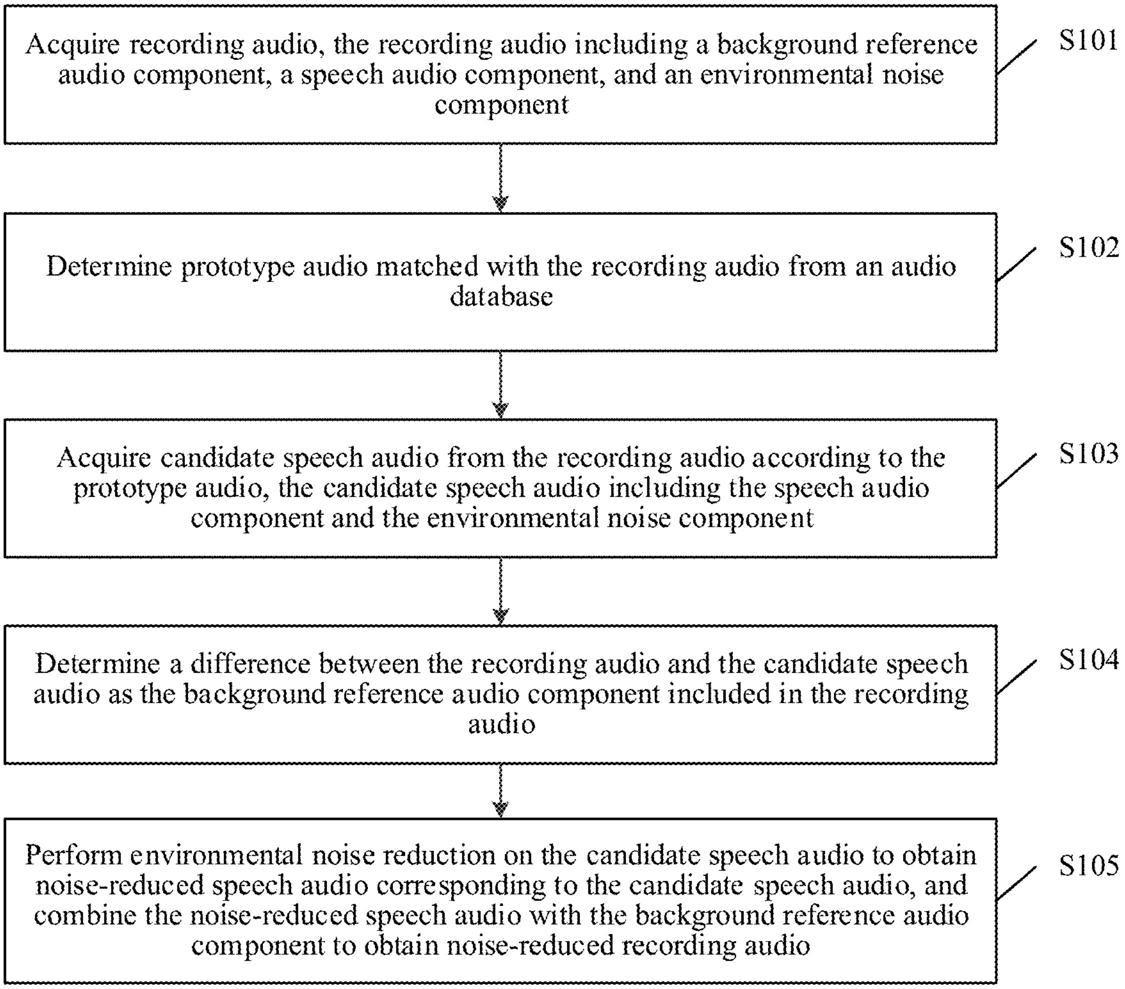
FIG. 3 is a schematic flowchart of an audio data processing method according to an embodiment of this application.

Referring to FIG. 3, FIG. 3 is a schematic flowchart of an audio data processing method according to an embodiment of this application. It will be appreciated that the audio data processing method may be performed by a computer device, and the computer device may be a user terminal, or a server, or a computer program application (including program codes) in a computer device, which is not specifically defined herein. As shown in FIG. 3, the audio data processing method may include S101 to S105.

S101: Acquire recorded audio, the recorded audio including a background reference audio component, a speech audio component, and an environmental noise component.

The computer device may acquire the recorded audio including the background reference audio component, the speech audio component, and the environmental noise component, and the recorded audio may be mixed audio collected by a recording device by recording an object to be recorded and an audio playback device in an environment to be recorded. The recording device may be a device having a recording function, such as a sound card device connected with a microphone and a mobile phone. The audio playback device may be a device having an audio playback function, such as a mobile phone, a music playback device, and an audio device. The object to be recorded may refer to a user needing speech recording, such as the user A in the foregoing embodiment corresponding to FIG. 2. The environment to be recorded may be a recording environment where the object to be recorded and the audio playback device are located, such as an indoor space or outdoor space (such as a street and a park) where the object to be recorded and the audio playback device are located. In a case that a certain device has both a recording function and an audio playback function, the device may serve as both the recording device and the audio playback device, that is, the audio playback device and the recording device in this application may be the same device, such as the user terminal 20*a* in the foregoing embodiment corresponding to FIG. 2. The recorded audio acquired by the computer device may be recording data transmitted to the computer device by the recording device, or may be recording data collected by the computer device itself. For example, in a case that the foregoing computer device has a recording function and an audio playback function, the computer device may serve as both the recording device and the audio playback device. The computer device may be installed with an audio application, and the foregoing process of recording of the recorded audio may be realized through a recording function in the audio application.

In a possible implementation, if the object to be recorded wants to record music sung by himself/herself, the object to be recorded may start the recording function in the recording device, use the audio playback device to play a music accompaniment, sing a song in the background of playing the music accompaniment, and use the recording device to record music. After the recording is completed, recorded music may serve as the foregoing recorded audio. In this case, the recorded audio may include the music accompaniment played by the audio playback device and the singing sound of the object to be recorded. In a case that the environment to be recorded is a noisy environment, the recorded audio may further include environmental noise in the environment to be recorded. The recorded music accompaniment here may serve as the background reference audio component in the recorded audio, such as the music accompaniment played by the user terminal 20*a* in the foregoing embodiment corresponding to FIG. 2. The recorded singing sound of the object to be recorded may serve as the speech audio component in the recorded audio, such as the singing sound of the user A in the foregoing embodiment corresponding to FIG. 2. The recorded environmental noise may serve as the environmental noise component in the recorded audio, such as the environmental noise in the environment where the user terminal 20*a* is located in the foregoing embodiment corresponding to FIG. 2. The recorded audio may be the music recorded audio 20*b* in the foregoing embodiment corresponding to FIG. 2.

In a possible implementation, if a target user wants to record his/her own dubbing audio, the object to be recorded may start the recording function in the recording device, use the audio playback device to play background audio in a segment to be dubbed, dub on the basis of playing the background audio, and use the recording device to record dubbing. After the recording is completed, recorded dubbing audio may serve as the foregoing recorded audio. In this case, the recorded audio may include the background audio played by the audio playback device and the dubbing of the object to be recorded. In a case that the environment to be recorded is a noisy environment, the recorded audio may further include environmental noise in the environment to be recorded. The recorded background audio here may serve as the background reference audio component in the recorded audio. The recorded dubbing of the object to be recorded may serve as the speech audio component in the recorded audio. The recorded environmental noise may serve as the environmental noise component in the recorded audio.

In other words, the recorded audio acquired by the computer device may include audio (such as the foregoing music accompaniment and background audio in the segment to be dubbed) played by the audio playback device, a speech (such as the foregoing dubbing and singing sound of the user) outputted by the object to be recorded, and environmental noise in the environment to be recorded. It will be appreciated that the foregoing music recording scene and dubbing recording scene are merely examples in this application, and this application may also be applied to other audio recording scenes such as: a human-machine question-answer interaction scene between the object to be recorded and the audio playback device, and a language performance scene (such as a crosstalk performance scene) between the object to be recorded and the audio playback device, which is not defined herein.

S102: Determine prototype audio matching the recorded audio from an audio database.

The recorded audio acquired by the computer device may include the environmental noise in the environment to be recorded in addition to the audio outputted by the object to be recorded and the audio played by the audio playback device. For example, in a case that the environment to be recorded where the object to be recorded and the audio playback device are located is a shopping mall, the environmental noise in the foregoing recorded audio may be the broadcasting sound of promotional activities of the shopping mall, the shouting sound of a store clerk, electronic noise of the recording device, or the like. In a case that the environment to be recorded where the object to be recorded and the audio playback device are located is an office, the environmental noise in the foregoing recorded audio may be the operating sound of an air conditioner, the rotating sound of a fan, electronic noise of the recording device, or the like. Therefore, the computer device needs to perform noise reduction on the acquired recorded audio, and the effect of noise reduction is to suppress the environmental noise in the recorded audio as much as possible, and to keep the audio outputted by the object to be recorded and the audio played by the audio playback device that are included in the recorded audio unchanged.

Because there may be similarities between the background reference audio component and the environmental noise component, noise reduction for the recorded audio may be converted into noise reduction for human voice noise-free audio excluding the background reference audio component to avoid the confusion between the background reference audio component and the environmental noise component. Therefore, the prototype audio matching the recorded audio may be first determined from the audio database to obtain candidate speech audio without the background reference audio component.

In a possible implementation, the implementation of S102 may be performing matching directly according to the recorded audio to obtain the prototype audio; and may also be first acquiring an audio fingerprint corresponding to the recorded audio, and acquiring the prototype audio matching the recorded audio from the audio database according to the audio fingerprint to be matched.

In the process of noise reduction for the recorded audio, the computer device may perform data compression on the recorded audio, and map the recorded audio to digital summary information. The digital summary information here may be referred to as the audio fingerprint to be matched corresponding to the recorded audio, and a data volume of the audio fingerprint to be matched is far less than a data volume of the foregoing recorded audio, thereby improving the retrieval accuracy and retrieval efficiency. The computer device may also acquire the audio database, acquire an audio fingerprint library corresponding to the audio database, match the foregoing audio fingerprint to be matching an audio fingerprint included in the audio fingerprint library, find out an audio fingerprint matching the audio fingerprint to be matched from the audio fingerprint library, and determine audio data corresponding to the matched audio fingerprint as the prototype audio (such as the music prototype audio 20*f* in the foregoing embodiment corresponding to FIG. 2) corresponding to the recorded audio. In other words, the computer device may retrieve the prototype audio matching the recorded audio from the audio database based on an audio fingerprint retrieval technology. The foregoing audio database may include all audio data included in the audio application, the audio fingerprint library may include an audio fingerprint corresponding to each audio data in the audio database, and the audio database and the audio fingerprint library may be pre-configured. For example, in a case that the foregoing recorded audio is music recorded audio, the audio database may be a database including all music sequences; and in a case that the foregoing recorded audio is dubbing recorded audio, the audio database may be a database including audio in all video data. When performing audio fingerprint retrieval for the recorded audio, the computer device may directly access the audio database and the audio fingerprint library to retrieve the prototype audio matching the recorded audio. The prototype audio may refer to original audio corresponding to audio, played by a speech playback device, in the recorded audio. For example, in a case that the recorded audio is music recorded audio, the prototype audio may be a music prototype corresponding to a music accompaniment included in the music recorded audio; and in a case that the recorded audio is dubbing recorded audio, the prototype audio may be prototype dubbing corresponding to video background audio included in the dubbing recorded audio.

The audio fingerprint retrieval technology adopted by the computer device may include, but is not limited to: the Philips audio retrieval technology (a retrieval technology, which may include two parts: a highly-robust fingerprint extraction method and an efficient fingerprint search strategy) and the Shazam audio retrieval technology (an audio retrieval technology, which may include two parts: audio fingerprint extraction and audio fingerprint matching). In this application, a suitable audio retrieval technology may be selected according to actual requirements to retrieve the foregoing prototype audio, such as: a technology improved based on the foregoing two audio fingerprint retrieval technologies, which is not defined herein. In the audio fingerprint retrieval technology, the audio fingerprint to be matched that is extracted by the computer device may be represented by a commonly used audio feature of recorded audio. The commonly used audio feature may include, but is not limited to: Fourier coefficients, Mel-frequency cepstral coefficients (MFCCs), spectral flatness, sharpness, linear predictive coefficients (LPCs), and the like. An audio fingerprint matching algorithm adopted by the computer device may include, but is not limited to: a distance-based matching algorithm (when the computer device finds out an audio fingerprint A that has the shortest distance from the audio fingerprint to be matched from the audio fingerprint library, it indicates that audio data corresponding to the audio fingerprint A is the prototype audio corresponding to the recorded audio), an index-based matching method, and a threshold value-based matching method. In this application, suitable audio fingerprint extraction algorithm and audio fingerprint matching algorithm may be selected according to actual requirements, which are not defined herein.

S103: Acquire candidate speech audio from the recorded audio according to the prototype audio, the candidate speech audio including the speech audio component and the environmental noise component.

After retrieving the prototype audio matching the recorded audio from the audio database, the computer device may filter the recorded audio according to the prototype audio to obtain candidate speech audio (which may also be referred to as a noise-carrying human voice signal, such as the music-free audio 20*k* in the foregoing embodiment corresponding to FIG. 2) included in the recorded audio. The candidate speech audio may include the speech audio component and the environmental noise component in the recorded audio. In other words, the candidate speech audio may be understood as recorded audio obtained by filtering out the audio outputted by the audio playback device, that is, the foregoing candidate speech audio may be obtained by removing the audio outputted by the audio playback device that is included in the recorded audio.

In a possible implementation, the computer device may perform frequency domain transformation on the recorded audio to obtain a first frequency spectrum feature corresponding to the recorded audio, and perform frequency domain transformation on the prototype audio to obtain a second frequency spectrum feature corresponding to the prototype audio. A frequency domain transformation method in this application may include, but is not limited to: Fourier transformation (FT), Laplace transform, Z-transformation, and variations or improvements of the foregoing three frequency domain transformation methods such as fast Fourier transformation (FFT) and discrete Fourier transform (DFT). The adopted frequency domain transformation method is not defined herein. The foregoing first frequency spectrum feature may be power spectrum data obtained by performing frequency domain transformation on the recorded audio, or may be a normalization result of the power spectrum data of the recorded audio. A process of acquisition of the foregoing second frequency spectrum feature is the same as that of the foregoing first frequency spectrum feature. For example, in a case that the first frequency spectrum feature is power spectrum data corresponding to the recorded audio, the second frequency spectrum feature is power spectrum data corresponding to the prototype audio; and in a case that the first frequency spectrum feature is normalized power spectrum data, the second frequency spectrum feature is normalized power spectrum data, and normalization methods adopted for the first frequency spectrum feature and the second frequency spectrum feature are the same. The foregoing normalization method may include, but is not limited to: instant layer normalization (iLN), layer normalization (LN), instance normalization (IN), group normalization (GN), switchable normalization (SN), and other normalization methods. The adopted normalization method is not defined herein.

The computer device may perform feature combination (concat) on the first frequency spectrum feature and the second frequency spectrum feature, and input a combined frequency spectrum feature as an input feature into a first deep network model (such as the first deep network model 20*g* in the foregoing embodiment corresponding to FIG. 2), a first frequency point gain (such as the frequency point gain sequence 20*h* in the foregoing embodiment corresponding to FIG. 2) may be outputted through the first deep network model, and then candidate speech audio is determined according to the first frequency point gain and recorded power spectrum data. For example, the foregoing candidate speech audio may be obtained by multiplying the first frequency point gain by the power spectrum data corresponding to the recorded audio and then performing time domain transformation. The time domain transformation here and the foregoing frequency domain transformation are inverse transformations. For example, in a case that the adopted frequency domain transformation method is Fourier transformation, the adopted time domain transformation method here is inverse Fourier transformation. A process of calculation of the candidate speech audio may refer to the process of calculation of the music-free audio 20*k* in the foregoing embodiment corresponding to FIG. 2, which will not be described in detail here.

The foregoing first deep network model may be configured to filter out the audio outputted by the audio playback device from the recorded audio, and the first deep neural network may include, but is not limited to: a gate recurrent unit (GRU), a long short term memory (LSTM), a deep neural network (DNN), a convolutional neural network (CNN), variations of any one of the foregoing network models, combined models of two or more network models, and the like. The network structure of the adopted first deep network model is not defined herein. A second deep network model involved in the following description may also include, but is not limited to, the foregoing network models. The second deep network model is configured to perform noise reduction on the candidate speech audio, and the second deep network model and the first deep network model may have the same network structure but have different model parameters (functions of the two network models are different); or, the second deep network model and the first deep network model may have different network structures and have different model parameters. The type of the second deep network model will not be described in detail subsequently.

S104: Determine a difference between the recorded audio and the candidate speech audio as the background reference audio component included in the recorded audio.

After obtaining the candidate speech audio according to the first deep network model, the computer device may subtract the candidate speech audio from the recorded audio to obtain the audio outputted by the audio playback device. In this application, the audio outputted by the audio device may be referred to as the background reference audio component (such as the pure music audio 20*p* in the foregoing embodiment corresponding to FIG. 2) in the recorded audio. The candidate speech audio includes the environmental noise component and the speech audio component in the recorded audio, and a result obtained by subtracting the candidate speech from the recorded audio is the background reference audio component included in the recorded audio.

The difference between the recorded audio and the candidate speech audio may be a waveform difference in a time domain or a frequency spectrum difference in a frequency domain. In a case that the recorded audio and the candidate speech audio are time domain waveform signals, a first signal waveform corresponding to the recorded audio and a second signal waveform corresponding to the candidate speech audio may be acquired, and both the first signal waveform and the second signal waveform may be represented in a two-dimensional coordinate system (the x-axis may represent time, and the y-axis may represent signal strength, which may also be referred to as signal amplitude), and then the second signal waveform may be subtracted from the first signal waveform to obtain a waveform difference between the recorded audio and the candidate speech audio in a time domain. When the candidate speech audio is subtracted from the recorded audio in the time domain, x-coordinates of the first signal waveform and the second signal waveform are kept unchanged, and only y-coordinates corresponding to the x-coordinates are subtracted to obtain a new waveform signal. The new waveform signal may be considered as a time domain waveform signal corresponding to the background reference audio component.

In a possible implementation, in a case that the recorded audio and the candidate speech audio are frequency domain signals, speech power spectrum data corresponding to the candidate speech audio may be subtracted from recorded power spectrum data corresponding to the recorded audio to obtain a frequency spectrum difference between the two. The frequency spectrum difference may be considered as a frequency domain signal corresponding to the background reference audio component. For example, if the recorded power spectrum data corresponding to the recorded audio is (5, 8, 10, 9, 7), and the speech power spectrum data corresponding to the candidate speech audio is (2, 4, 1, 5, 6), a frequency spectrum difference obtained by subtracting the two may be (3, 4, 9, 4, 1). In this case, the frequency spectrum difference (3, 4, 9, 4, 1) may be referred to as the frequency domain signal corresponding to the background reference audio component.

S105: Perform environmental noise reduction on the candidate speech audio to obtain noise-reduced speech audio corresponding to the candidate speech audio, and combine the noise-reduced speech audio with the background reference audio component to obtain noise-reduced recorded audio.

The computer device may perform noise reduction on the candidate speech audio, that is, the environmental noise in the candidate speech audio is suppressed to obtain noise-reduced speech audio (such as the human voice noise-free audio 20*n* in the foregoing embodiment corresponding to FIG. 2) corresponding to the candidate speech audio.

The foregoing noise reduction for the candidate speech audio may be realized through the foregoing second deep network model. The computer device may perform frequency domain transformation on the candidate speech audio to obtain power spectrum data (which may be referred to as speech power spectrum data) corresponding to the candidate speech audio, and input the speech power spectrum data into the second deep network model, a second frequency point gain may be outputted through the second deep network model, a weighted speech frequency domain signal corresponding to the candidate speech audio is obtained according to the second frequency point gain and the speech power spectrum data, and then time domain transformation is performed on the weighted speech frequency domain signal to obtain the noise-reduced speech audio corresponding to the candidate speech audio. For example, the foregoing noise-reduced speech audio may be obtained by multiplying the second frequency point gain by the speech power spectrum data corresponding to the candidate speech audio and then performing time domain transformation. Then, the noise-reduced speech audio and the foregoing background reference audio component may be superimposed to obtain noise-reduced recorded audio (such as the noise-reduced music recorded audio 20*q* in the foregoing embodiment corresponding to FIG. 2).

The execution order of S104 and "performing environmental noise reduction on the candidate speech audio to obtain noise-reduced speech audio corresponding to the candidate speech audio" in S105 are not defined in the embodiments of this application.

In a possible implementation, the computer device may share the noise-reduced recorded audio to a social networking system, so that a terminal device in the social networking system may play the noise-reduced recorded audio when accessing the noise-reduced recorded audio. The foregoing social networking system refers to an application or web page that may be used for sharing and propagating audio and video data. For example, the social networking system may be an audio application, or a video application, or a content sharing platform, or the like.

Figure 4:
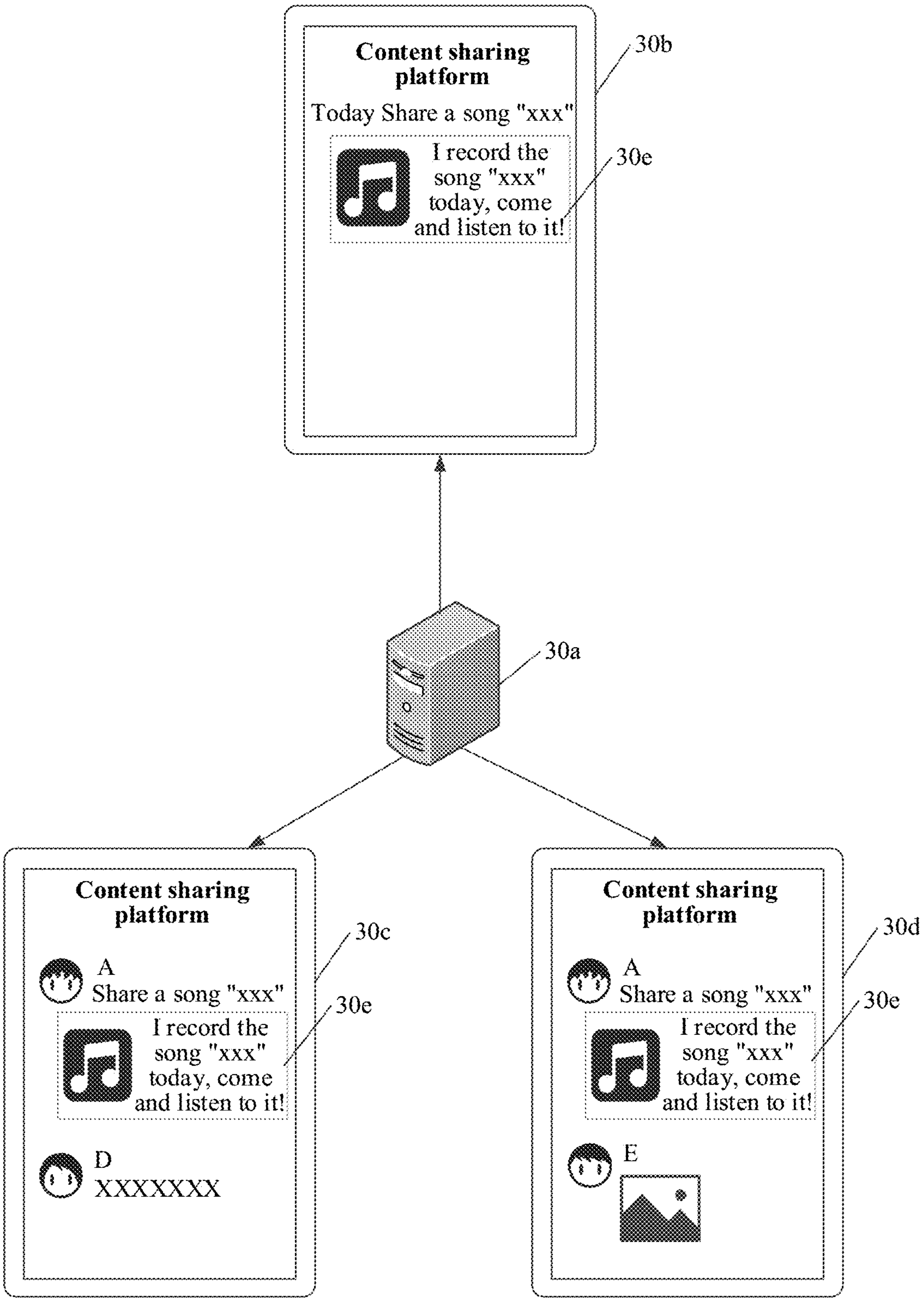
FIG. 4 is a schematic diagram of a music recording scene according to an embodiment of this application.

For example, in a music recording scene, the noise-reduced recorded audio may be noise-reduced music recorded audio, the computer device may share the noise-reduced music recorded audio to a content sharing platform (in this case, the social networking system defaults to the content sharing platform), and the terminal device may play the noise-reduced music recorded audio when accessing the noise-reduced music recorded audio shared in the content sharing platform. Referring to FIG. 4, FIG. 4 is a schematic diagram of a music recording scene according to an embodiment of this application. A server 30*a* shown in FIG. 4 may be a backend server of a content sharing platform, a user terminal 30*b* may be a terminal device used by a user A, and the user A is a user who shares noise-reduced music recorded audio 30*e* to the content sharing platform. A user terminal 30*c* may be a terminal device used by a user B and a user terminal 30*d* may be a terminal device used by a user C. After obtaining the noise-reduced music recorded audio 30*e*, the server 30*a* may share the noise-reduced music recorded audio 30*e* to the content sharing platform. In this case, the content sharing platform in the user terminal 30*b* may display the noise-reduced music recorded audio 30*e* and information such as sharing time corresponding to the noise-reduced music recorded audio 30*e*. When the user B uses the user terminal 30*c* to access the content sharing platform, contents shared by different users may be displayed in the content sharing platform of the user terminal 30*c*, the contents may include the noise-reduced music recorded audio 30*e* shared by the user A, and after the noise-reduced music recorded audio 30*e* is clicked, the noise-reduced music recorded audio 30*e* may be played by the user terminal 30*c*. Similarly, when the user C uses the user terminal 30*d* to access the content sharing platform, the noise-reduced music recorded audio 30*e* shared by the user A may be displayed in the content sharing platform of the user terminal 30*d*, and after the noise-reduced music recorded audio 30*e* is clicked, the noise-reduced music recorded audio 30*e* may be played by the user terminal 30*d*.

In the embodiments of this application, the recorded audio may be mixed audio including a speech audio component, a background reference audio component, and an environmental noise component. In the process of noise reduction for the recorded audio, prototype audio corresponding to the recorded audio may be found out from an audio database, candidate speech audio may be screened out from the recorded audio according to the prototype audio, and the background reference audio component may be obtained by subtracting the candidate speech audio from the foregoing recorded audio. Then, noise reduction may be performed on the candidate speech audio to obtain noise-reduced speech audio, and the noise-reduced speech audio and the background reference audio component may be superimposed to obtain noise-reduced recorded audio. In other words, by converting noise reduction for the recorded audio into noise reduction for the candidate speech audio, the confusion between the background reference audio component and the environmental noise in the recorded audio can be avoided, and a noise reduction effect on the recorded audio can be improved.

Figure 5:
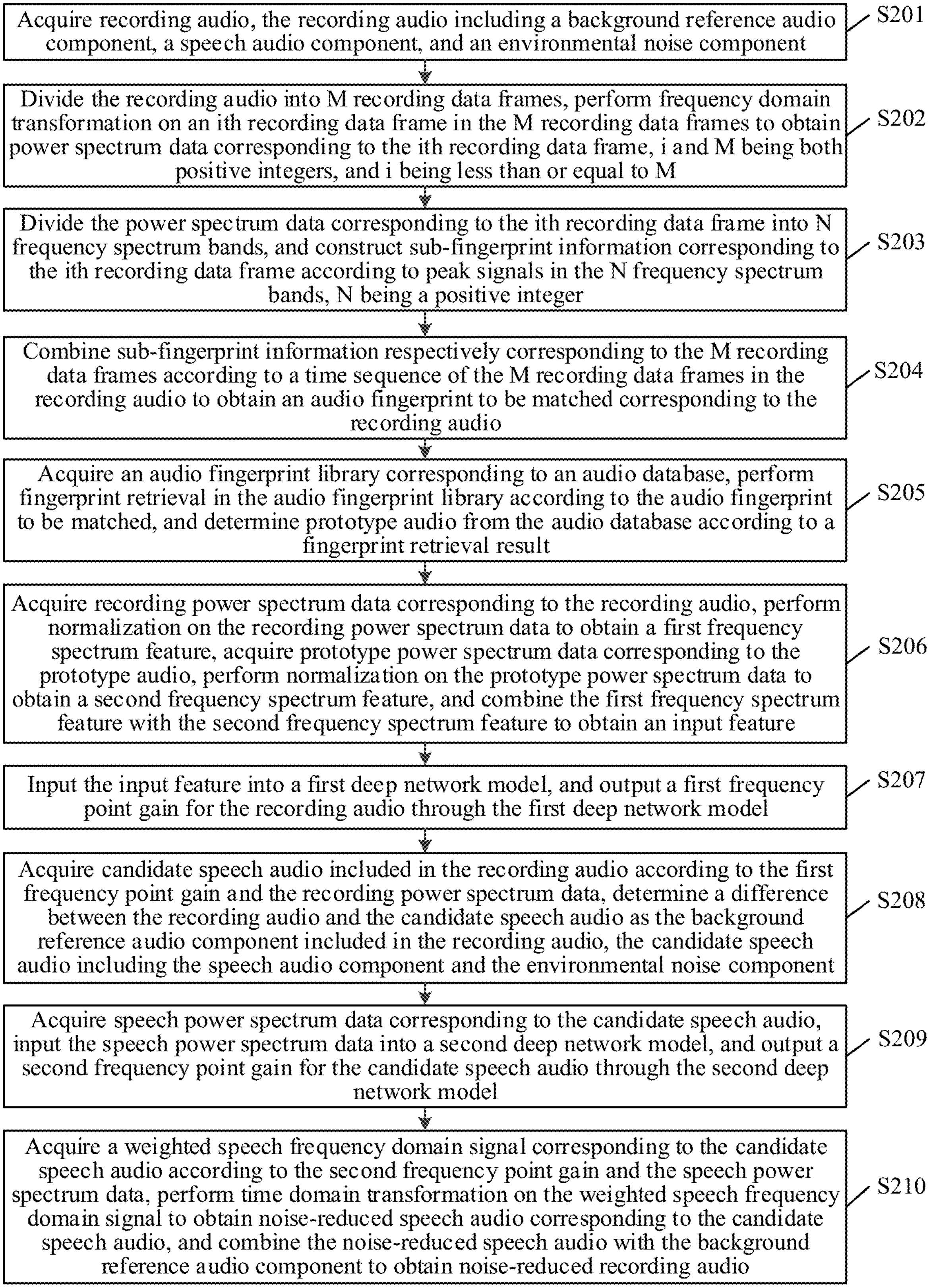
FIG. 5 is a schematic flowchart of an audio data processing method according to an embodiment of this application.

Referring to FIG. 5, FIG. 5 is a schematic flowchart of an audio data processing method according to an embodiment of this application. It will be appreciated that the audio data processing method may be performed by a computer device, and the computer device may be a user terminal, or a server, or a computer program application (including program codes) in a computer device, which is not specifically defined herein. As shown in FIG. 5, the audio data processing method may include S201 to S210.

S201: Acquire recorded audio, the recorded audio including a background reference audio component, a speech audio component, and an environmental noise component.

A specific implementation of S201 may refer to S101 in the foregoing embodiment corresponding to FIG. 3, which will not be described in detail here.

S202: Divide the recorded audio into M recorded data frames, and perform frequency domain transformation on an ith recorded data frame in the M recorded data frames to obtain power spectrum data corresponding to the ith recorded data frame, i and M being both positive integers, and i being less than or equal to M.

The computer device may perform frame division on the recorded audio to divide the recorded audio into M recorded data frames, perform frequency domain transformation on an ith recorded data frame in the M recorded data frames, for example, perform Fourier transformation on the ith recorded data frame to obtain power spectrum data corresponding to the ith recorded data frame. M may be a positive integer greater than 1. For example, M may take the value of 2, 3, . . . , and i may be a positive integer less than or equal to M. The computer device may perform frame division on the recorded audio through a sliding window to obtain M recorded data frames. To maintain the continuity of adjacent recorded data frames, frame division may usually be performed on the recorded audio by an overlapping and segmentation method, and the size of the recorded data frames may be associated with the size of the sliding window.

Frequency domain transformation (such as Fourier transformation) may be performed independently on each recorded data frame in the M recorded data frames to obtain power spectrum data respectively corresponding to each recorded data frame. The power spectrum data may include energy values (the energy values here may also be referred to as amplitude values of the power spectrum data) respectively corresponding to frequency points, one energy value in the power spectrum data corresponds to one frequency point, and one frequency point may be understood as one frequency sampling point during frequency domain transformation.

S203: Divide the power spectrum data corresponding to the ith recorded data frame into N frequency spectrum bands, and construct sub-fingerprint information corresponding to the ith recorded data frame according to peak signals in the N frequency spectrum bands, N being a positive integer.

The computer device may construct sub-fingerprint information respectively corresponding to each recorded data frame according to the power spectrum data respectively corresponding to each recorded data frame. The key to construction of the sub-fingerprint information is to select an energy value with the greatest discrimination from the power spectrum data corresponding to each recorded data frame. A process of construction of the sub-fingerprint information will be described below by taking the ith recorded data frame as an example. The computer device may divide the power spectrum data corresponding to the ith recorded data frame into N frequency spectrum bands, and select a peak signal (that is, a maximum value in each frequency spectrum band, which may also be understood as a maximum energy value in each frequency spectrum band) in each frequency spectrum band as a signature of each frequency spectrum band to construct sub-fingerprint information corresponding to the ith recorded data frame. N may be a positive integer. For example, N may take the value of 1, 2, . . . . In other words, the sub-fingerprint information corresponding to the ith recorded data frame may include the peak signals respectively corresponding to the N frequency spectrum bands.

S204: Combine sub-fingerprint information respectively corresponding to the M recorded data frames according to a time sequence of the M recorded data frames in the recorded audio to obtain an audio fingerprint corresponding to the recorded audio.

The computer device may acquire the sub-fingerprint information respectively corresponding to the M recorded data frames according to the foregoing description of S203, and then combine the sub-fingerprint information respectively corresponding to the M recorded data frames in sequence according to a time sequence of the M recorded data frames in the recorded audio to obtain an audio fingerprint corresponding to the recorded audio. By selecting the peak signals to construct the audio fingerprint to be matched, it can be ensured that the audio fingerprint to be matched is kept unchanged in various noisy and distortion environments as much as possible.

S205: Acquire an audio fingerprint library corresponding to an audio database, perform fingerprint retrieval in the audio fingerprint library according to the audio fingerprint to be matched, and determine prototype audio from the audio database according to a fingerprint retrieval result.

The computer device may acquire an audio database and acquire an audio fingerprint library corresponding to the audio database. For each audio data in the audio database, an audio fingerprint respectively corresponding to each audio data in the audio database may be obtained according to the foregoing description of S201 to S204, and an audio fingerprint corresponding to each audio data may constitute the audio fingerprint library corresponding to the audio database. The audio fingerprint library is pre-constructed. After acquiring the audio fingerprint to be matched corresponding to the recorded audio, the computer device may directly acquire the audio fingerprint library, and perform fingerprint retrieval in the audio fingerprint library based on the audio fingerprint to be matched to obtain an audio fingerprint matching the audio fingerprint to be matched. The matched audio fingerprint may be used as a fingerprint retrieval result corresponding to the audio fingerprint to be matched, and then audio data corresponding to the fingerprint retrieval result may be determined as the prototype audio matching the recorded audio.

The computer device may store the audio fingerprint as a key in an audio retrieval hash table. A single audio data frame included in each audio data may correspond to one piece of sub-fingerprint information, and one piece of sub-fingerprint information may correspond to one key in the audio retrieval hash table. Sub-fingerprint information corresponding to all audio data frames included in each audio data may constitute an audio fingerprint corresponding to each audio data. To facilitate searching, each piece of sub-fingerprint information may serve as a key in a hash table, and each key may point to the time when sub-fingerprint information appears in audio data to which the sub-fingerprint information belongs, and may also point to an identifier of the audio data to which the sub-fingerprint information belongs. For example, after a certain piece of sub-fingerprint information is converted into a hash value, the hash value may be stored as a key in an audio retrieval hash table, and the key points to the time when the sub-fingerprint information appears in audio data to which the sub-fingerprint information belongs being 02:30, and points to an identifier of the audio data being: audio data 1. It will be appreciated that the foregoing audio fingerprint library may include one or more hash values corresponding to each audio data in the audio database.

In a case that the recorded audio is divided into M audio data frames, the audio fingerprint to be matched corresponding to the recorded audio may include M pieces of sub-fingerprint information, and one piece of sub-fingerprint information corresponds to one audio data frame. The computer device may map the M pieces of sub-fingerprint information included in the audio fingerprint to be matched to M hash values to be matched, and acquire recording time respectively corresponding to the M hash values to be matched. The recording time corresponding to one hash value to be matched is used for characterizing the time when sub-fingerprint information corresponding to the hash value to be matched appears in the recorded audio. In a case that a pth hash value to be matched in the M hash values to be matched is matching a first hash value included in the audio fingerprint library, a first time difference between recording time corresponding to the pth hash value to be matched and time information corresponding to the first hash value is acquired. p is a positive integer less than or equal to M. In a case that a qth hash value to be matched in the M hash values to be matched is matching a second hash value included in the audio fingerprint library, a second time difference between recording time corresponding to the qth hash value to be matched and time information corresponding to the second hash value is acquired. q is a positive integer less than or equal to M. In a case that the first time difference and the second time difference satisfy a numerical threshold value, and the first hash value and the second hash value belong to the same audio fingerprint, the audio fingerprint to which the first hash value belongs may be determined as a fingerprint retrieval result, and audio data corresponding to the fingerprint retrieval result is determined as the prototype audio corresponding to the recorded audio. Furthermore, the computer device may match the foregoing M hash values to be matching hash values in the audio fingerprint library, each successfully matched hash value to be matched may be calculated to obtain a time difference, and after all the M hash values to be matched are matched, a maximum value of the same time difference may be counted. In this case, the maximum value may be set as the foregoing numerical threshold value, and audio data corresponding to the maximum value is determined as the prototype audio corresponding to the recorded audio.

For example, the M hash values to be matched include a hash value 1, a hash value 2, a hash value 3, a hash value 4, a hash value 5, and a hash value 6, a hash value A in the audio fingerprint library is matching the hash value 1, the hash value A points to audio data 1, and a time difference between the hash value A and the hash value 1 is t1. A hash value B in the audio fingerprint library is matching the hash value 2, the hash value B points to the audio data 1, and a time difference between the hash value B and the hash value 2 is t2. A hash value C in the audio fingerprint library is matching the hash value 3, the hash value C points to the audio data 1, and a time difference between the hash value C and the hash value 3 is t3. A hash value D in the audio fingerprint library is matching the hash value 4, the hash value D points to the audio data 1, and a time difference between the hash value D and the hash value 4 is t4. A hash value E in the audio fingerprint library is matching the hash value 5, the hash value E points to audio data 2, and a time difference between the hash value E and the hash value 5 is t5. A hash value F in the audio fingerprint library is matching the hash value 6, the hash value 6 points to the audio data 2, and a time difference between the hash value F and the hash value 6 is t6. In a case that the foregoing time difference t1, time difference t2, time difference t3, and time difference t4 are the same time difference, and the time difference t5 and the time difference t6 are the same time difference, the audio data 1 may be used as the prototype audio corresponding to the recorded audio.

S206: Acquire recorded power spectrum data corresponding to the recorded audio, and perform normalization on the recorded power spectrum data to obtain a first frequency spectrum feature; and acquire prototype power spectrum data corresponding to the prototype audio, perform normalization on the prototype power spectrum data to obtain a second frequency spectrum feature, and combine the first frequency spectrum feature with the second frequency spectrum feature to obtain an input feature.

The computer device may acquire recorded power spectrum data corresponding to the recorded audio. The recorded power spectrum data may be composed of power spectrum data respectively corresponding to the foregoing M audio data frames, and the recorded power spectrum data may include energy values respectively corresponding to frequency points in the recorded audio. Normalization is performed on the recorded power spectrum data to obtain a first frequency spectrum feature. In a case that the normalization here is iLN, normalization may be performed independently on energy values corresponding to frequency points in the recorded power spectrum data. Of course, other normalization, such as BN, may also be adopted in this application. Optionally, in the embodiments of this application, the recorded power spectrum data may be used directly as the first frequency spectrum feature without normalization of the recorded power spectrum data. Similarly, the same frequency domain transformation (for obtaining prototype power spectrum data) and normalization may be performed on the prototype audio as the foregoing recorded audio to obtain the second frequency spectrum feature corresponding to the prototype audio. Then, the first frequency spectrum feature and the second frequency spectrum feature may be combined into the input feature through concat.

S207: Input the input feature into a first deep network model, and output a first frequency point gain for the recorded audio through the first deep network model.

The computer device may input the input feature into a first deep network model, and a first frequency point gain for the recorded audio may be outputted through the first deep network model. The first frequency point gain here may include speech gains respectively corresponding to frequency points in the recorded audio.

In a case that the first deep network model includes a GRU (may serve as a feature extraction network layer), a fully-connected network (may serve as a fully-connected network layer), and a Sigmoid function (may be referred to as an activation layer, and may serve as an output layer in this application), the input feature is first inputted into the feature extraction network layer in the first deep network model, and a time sequence distribution feature corresponding to the input feature may be acquired according to the feature extraction network layer. The time sequence distribution feature may be used for characterizing context semantics in the recorded audio. A time sequence feature vector corresponding to the time sequence distribution feature is acquired according to the fully-connected network layer in the first deep network model, and then a first frequency point gain is outputted through the activation layer in the first deep network model according to the time sequence feature vector. For example, speech gains (that is, the first frequency point gain) respectively corresponding to frequency points included in the recorded audio may be outputted by the Sigmoid function (serving as the activation layer).

S208: Acquire candidate speech audio included in the recorded audio according to the first frequency point gain and the recorded power spectrum data; and determine a difference between the recorded audio and the candidate speech audio as the background reference audio component included in the recorded audio, the candidate speech audio including the speech audio component and the environmental noise component.

If the recorded audio includes T frequency points (T is a positive integer greater than 1), then the first frequency point gain may include speech gains respectively corresponding to the T frequency points, the recorded power spectrum data includes energy values respectively corresponding to the T frequency points, and the T speech gains correspond to the T energy values in a one-to-one manner. The computer device may weigh the energy values, belonging to the same frequency points, in the recorded power spectrum data according to the speech gains, respectively corresponding to the T frequency points, in the first frequency point gain to obtain weighted energy values respectively corresponding to the T frequency points. Then, a weighted recording frequency domain signal corresponding to the recorded audio may be determined according to the weighted energy values respectively corresponding to the T frequency points. Time domain transformation (which is an inverse transformation with respect to the foregoing frequency domain transformation) is performed on the weighted recording frequency domain signal to obtain the candidate speech audio included in the recorded audio. For example, in a case that the first frequency point gain outputted by the first deep network model is (2, 3), and the recorded power spectrum data is (1, 2), it is indicated that the recorded audio may include two frequency points (T here takes the value of 2), a speech gain of a first frequency point in the first frequency point gain is 2 and an energy value in the recorded power spectrum data is 1, and a speech gain of a second frequency point in the first frequency point gain is 3 and an energy value in the recorded power spectrum data is 2. A weighted recording frequency domain signal of (2, 6) may be calculated, and the candidate speech audio included in the recorded audio may be obtained by performing time domain transformation on the weighted recording frequency domain signal. Further, the difference between the recorded audio and the candidate speech audio may be determined as the background reference audio component, that is, the audio outputted by the audio playback device.

Figure 6:
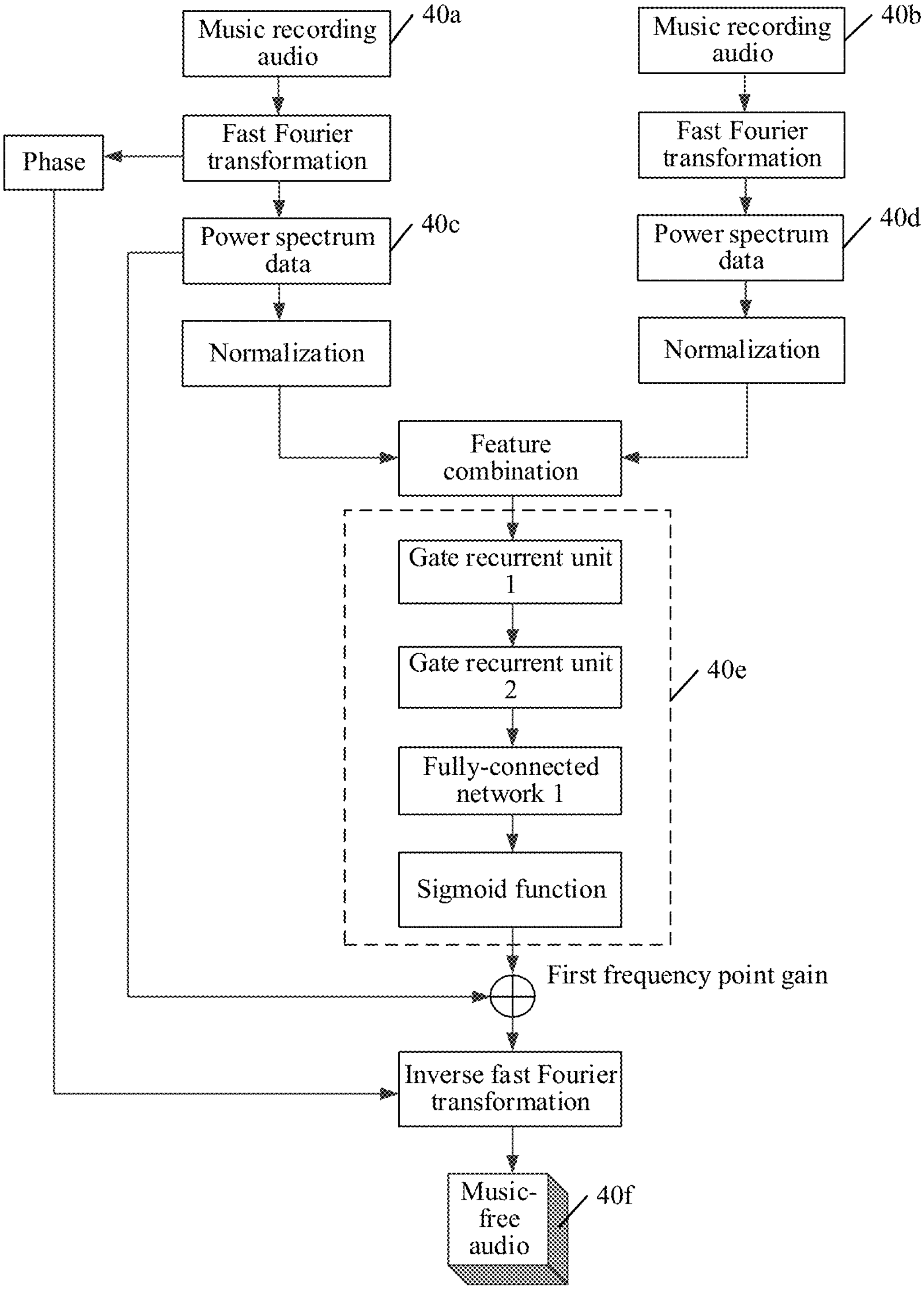
FIG. 6 is a schematic structural diagram of a first deep network model according to an embodiment of this application.

Referring to FIG. 6, FIG. 6 is a schematic structural diagram of a first deep network model according to an embodiment of this application. A network structure of the first deep network model will be described by taking a music recording scene as an example. As shown in FIG. 6, after retrieving music prototype audio 40*b* (that is, prototype audio) corresponding to music recorded audio 40*a* (that is, recorded audio) from an audio database, a computer device may perform fast Fourier transformation (FFT) on the music recorded audio 40*a* and the music prototype audio 40*b*, respectively, to obtain power spectrum data 40*c* (that is, recorded power spectrum data) and a phase corresponding to the music recorded audio 40*a*, as well as power spectrum data 40*d* (that is, prototype power spectrum data) corresponding to the music prototype audio 40*b*. The foregoing fast Fourier transformation is merely an example in this embodiment, and other frequency domain transformation methods, such as discrete Fourier transform, may be used in this application. After iLN is performed on a power spectrum of each frame in the power spectrum data 40*c* and the power spectrum data 40*d*, feature combination is performed through concat, and an input feature obtained by combination is taken as input data of a first deep network model 40*e*. The first deep network model 40*e* may be composed of a gate recurrent unit 1, a gate recurrent unit 2, and a fully-connected network 1, and finally a first frequency point gain is outputted through a Sigmoid function. After a speech gain of each frequency point included in the first frequency point gain is multiplied by an energy value (which may also be referred to as a frequency point power spectrum) of the corresponding frequency point in the power spectrum data 40*c*, inverse fast Fourier transformation (iFFT) may be performed to obtain music-free audio 40*f* (that is, the foregoing candidate speech audio). The inverse fast Fourier transformation may be a time domain transformation method, that is, a transformation from a frequency domain to a time domain. It will be appreciated that the network structure of the first deep network model 40*e* shown in FIG. 6 is merely an example, and the first deep network model used in the embodiments of this application may also be obtained by adding a gate recurrent unit or fully-connected network structure on the basis of the foregoing first deep network model 40*e*, which is not defined herein.

S209: Acquire speech power spectrum data corresponding to the candidate speech audio, input the speech power spectrum data into a second deep network model, and output a second frequency point gain for the candidate speech audio through the second deep network model.

After acquiring the candidate speech audio, the computer device may perform frequency domain transformation on the candidate speech audio to obtain speech power spectrum data corresponding to the candidate speech audio, and input the speech power spectrum data into a second deep network model, and a second frequency point gain for the candidate speech audio may be outputted through a feature extraction network layer (which may be a GRU), a fully-connected network layer (which may be a fully-connected network), and an activation layer (a Sigmoid function) in the second deep network model. The second frequency point gain may include noise reduction gains respectively corresponding to frequency points in the candidate speech audio, and may be an output value of the Sigmoid function.

S210: Acquire a weighted speech frequency domain signal corresponding to the candidate speech audio according to the second frequency point gain and the speech power spectrum data; and perform time domain transformation on the weighted speech frequency domain signal to obtain noise-reduced speech audio corresponding to the candidate speech audio, and combine the noise-reduced speech audio with the background reference audio component to obtain noise-reduced recorded audio.

If the candidate speech audio includes D frequency points (D is a positive integer greater than 1, D here may be equal to the foregoing T or may not be equal to the foregoing T, and the two may take values according to actual requirements, which are not defined herein), then the second frequency point gain may include noise reduction gains respectively corresponding to the D frequency points, the speech power spectrum data includes energy values respectively corresponding to the D frequency points, and the D noise reduction gains correspond to the D energy values in a one-to-one manner. The computer device may weigh the energy values, belonging to the same frequency points, in the speech power spectrum data according to the noise reduction gains, respectively corresponding to the D frequency points, in the second frequency point gain to obtain weighted energy values respectively corresponding to the D frequency points. Then, a weighted speech frequency domain signal corresponding to the candidate speech audio may be determined according to the weighted energy values respectively corresponding to the D frequency points. Time domain transformation (which is an inverse transformation with respect to the foregoing frequency domain transformation) is performed on the weighted speech frequency domain signal to obtain noise-reduced speech audio corresponding to the candidate speech audio. For example, in a case that the second frequency point gain outputted by the second deep network model is (0.1, 0.5), and the speech power spectrum data is (5, 8), it is indicated that the candidate speech audio may include two frequency points (D here takes the value of 2), a noise reduction gain of a first frequency point in the second frequency point gain is 0.1 and an energy value in the speech power spectrum data is 5, and a noise reduction gain of a second frequency point in the second frequency point gain is 0.5 and an energy value in the speech power spectrum data is 8. A weighted speech frequency domain signal of (0.5, 4) may be calculated, and the noise-reduced speech audio corresponding to the candidate speech audio may be obtained by performing time domain transformation on the weighted speech frequency domain signal. Further, the noise-reduced speech audio and the background reference audio component may be superimposed to obtain noise-reduced recorded audio.

Figure 7:
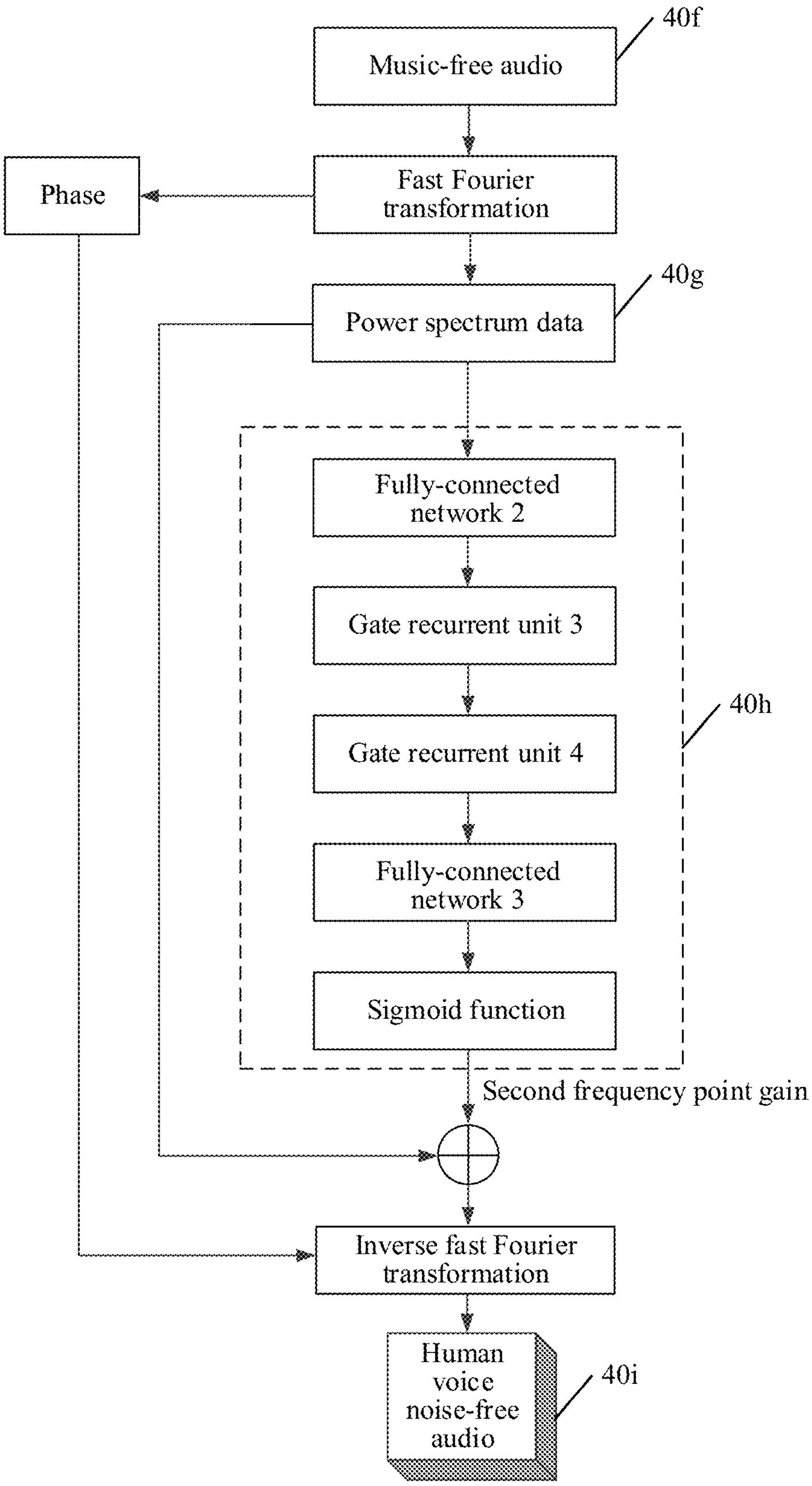
FIG. 7 is a schematic structural diagram of a second deep network model according to an embodiment of this application.

Referring to FIG. 7, FIG. 7 is a schematic structural diagram of a second deep network model according to an embodiment of this application. As shown in FIG. 7, according to the foregoing embodiment corresponding to FIG. 6, after obtaining the music-free audio 40*f* through the first deep network model 40*e*, the computer device may perform fast Fourier transformation (FFT) on the music-free audio 40*f* to obtain power spectrum data 40*g* (that is, the foregoing speech power spectrum data) and a phase corresponding to the music-free audio 40*f* The power spectrum data 40*g* is taken as input data of a second deep network model 40*h*. The second deep network model 40*h* may be composed of a fully-connected network 2, a gate recurrent unit 3, a gate recurrent unit 4, and a fully-connected network 3, and finally a second frequency point gain may be outputted by a Sigmoid function. After a noise reduction gain of each frequency point included in the second frequency point gain is multiplied by an energy value of the corresponding frequency point in the power spectrum data 40*g*, inverse fast Fourier transformation (iFFT) is performed to obtain a human voice noise-free audio 40*i* (that is, the foregoing noise-reduced speech audio). It will be appreciated that the network structure of the second deep network model 40*h* shown in FIG. 7 is merely an example, and the second deep network model used in the embodiments of this application may also be obtained by adding a gate recurrent unit or fully-connected network structure on the basis of the foregoing second deep network model 40*h*, which is not defined herein.

Figure 8:
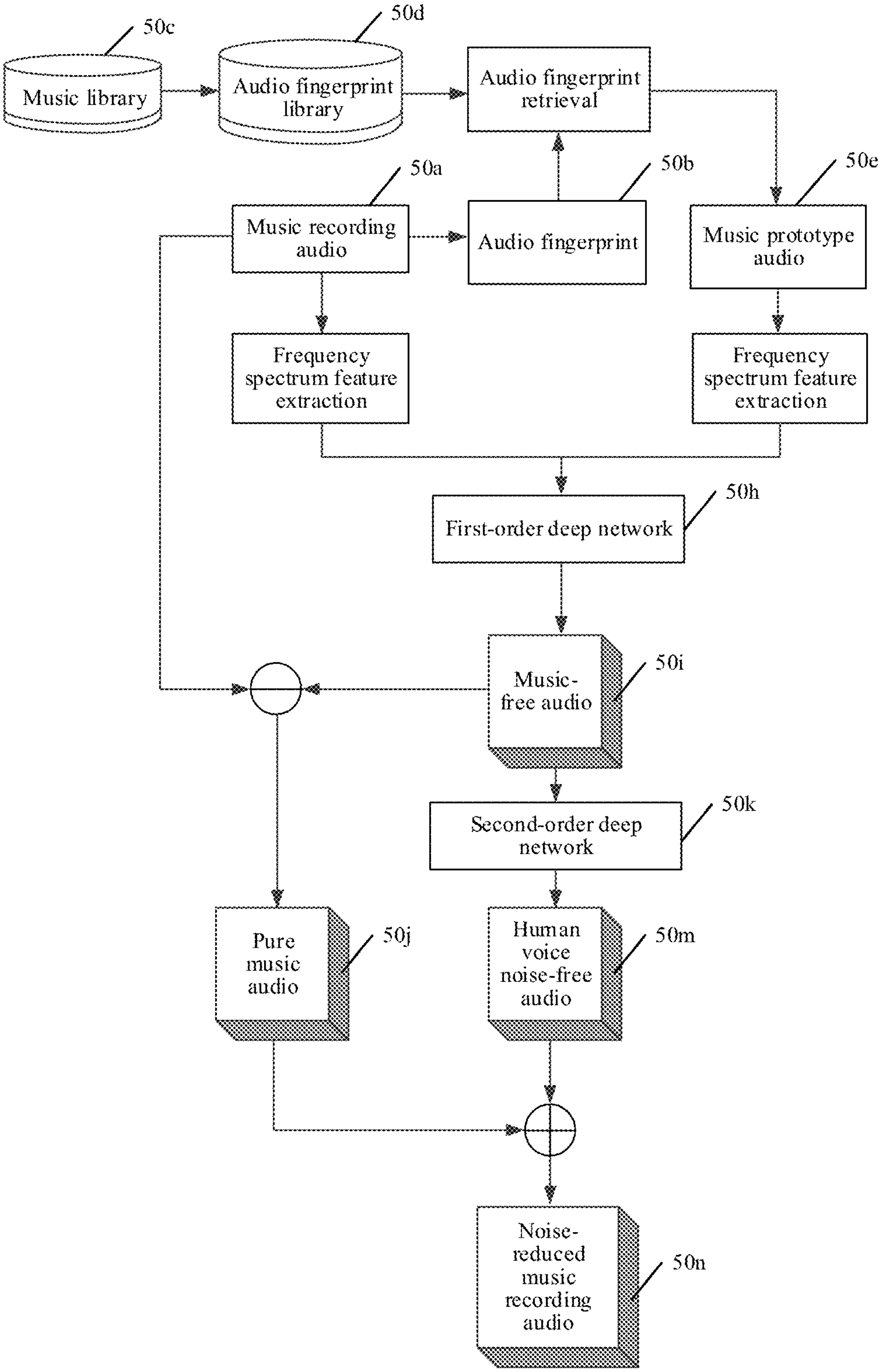
FIG. 8 is a schematic flowchart of noise reduction for recorded audio according to an embodiment of this application.

Referring to FIG. 8, FIG. 8 is a schematic flowchart of noise reduction for recorded audio according to an embodiment of this application. As shown in FIG. 8, a music recording scene is taken as an example in this embodiment, after acquiring music recorded audio 50*a*, a computer device may acquire an audio fingerprint 50*b* corresponding to the music recorded audio 50*a*, perform audio fingerprint retrieval in an audio fingerprint library 50*d* corresponding to a music library 50*c* (that is, the foregoing audio database) based on the audio fingerprint 50*b*, and determine certain audio data in the music library 50*c* as music prototype audio 50*e* corresponding to the music recorded audio 50*a* in a case that an audio fingerprint corresponding to the audio data in the music library 50*c* is matching the audio fingerprint 50*b*. A process of extraction of the audio fingerprint 50*b* and a process of audio fingerprint retrieval for the audio fingerprint 50*b* may refer to the foregoing description of S202 to S205, which will not be described in detail here.

In a possible implementation, frequency spectrum feature extraction may be performed on the music recorded audio 50*a* and the music prototype audio 50*e*, respectively, feature combination is performed on acquired frequency spectrum features, a combined frequency spectrum feature is inputted into a first-order deep network 50*h* (that is, the foregoing first deep network model), and music-free audio 50*i* may be obtained through the first-order deep network 50*h* (a process of acquisition of the music-free audio 50*i* may refer to the foregoing embodiment corresponding to FIG. 6, which will not be described in detail here). A frequency spectrum feature extraction process may include frequency domain transformation such as Fourier transformation and normalization such as iLN. Then, pure music audio 50*j* (that is, the foregoing background reference audio component) may be obtained by subtracting the music-free audio 50*i* from the music recorded audio 50*a*.

Fast Fourier transformation may be performed on the music-free audio 50*i* to obtain power spectrum data corresponding to the music-free audio 50*i*, and the power spectrum data is taken as an input of a second-order deep network 50*k* (that is, the foregoing second deep network model), and a human voice noise-free audio 50*m* may be obtained through the second-order deep network 50*k* (a process of acquisition of the human voice noise-free audio 50*m* may refer to the foregoing embodiment corresponding to FIG. 7, which will not be described in detail here). Then, the pure music audio 50*j* and the human voice noise-free audio 50*m* may be superimposed to obtain final noise-reduced music recorded audio 50*n* (that is, noise-reduced recorded audio).

In the embodiments of this application, the recorded audio may be mixed audio including a speech audio component, a background reference audio component, and an environmental noise component. In the process of noise reduction for the recorded audio, prototype audio corresponding to the recorded audio may be found out through audio fingerprint retrieval, candidate speech audio may be screened out from the recorded audio according to the prototype audio, and the background reference audio component may be obtained by subtracting the candidate speech audio from the foregoing recorded audio. Then, noise reduction may be performed on the candidate speech audio to obtain noise-reduced speech audio, and the noise-reduced speech audio and the background reference audio component may be superimposed to obtain noise-reduced recorded audio. In other words, by converting noise reduction for the recorded audio into noise reduction for the candidate speech audio, the confusion between the background reference audio component and the environmental noise in the recorded audio can be avoided, and a noise reduction effect on the recorded audio can be improved. An audio fingerprint retrieval technology is used to retrieve prototype audio, thereby improving the retrieval accuracy and retrieval efficiency.

Before being used in a recording scene, the foregoing first deep network model and second deep network model need to be trained. A process of training of the first deep network model and the second deep network model will be described below with reference to FIG. 9 and FIG. 10.

Figure 9:
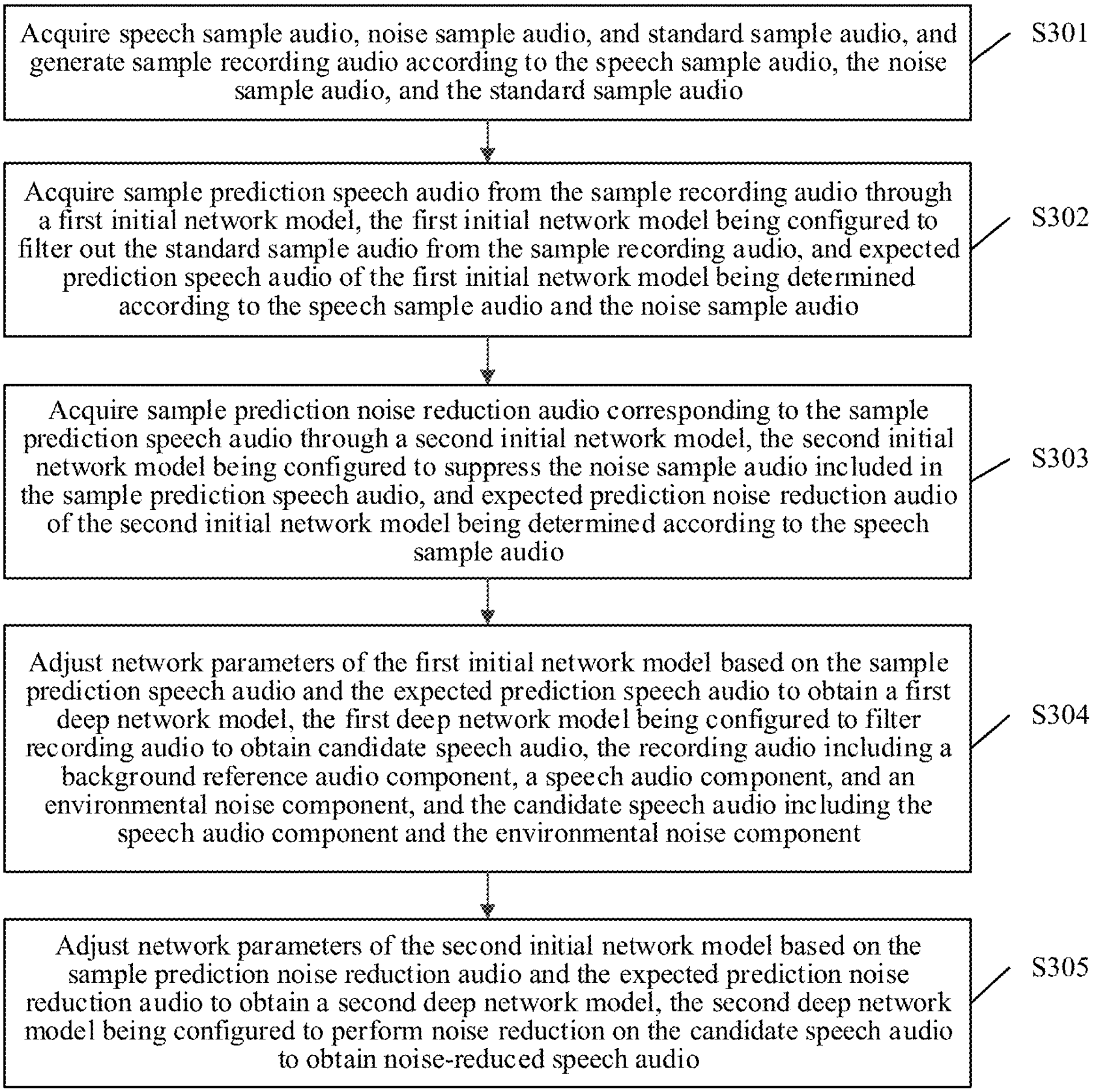
FIG. 9 is a schematic flowchart of an audio data processing method according to an embodiment of this application.

Referring to FIG. 9, FIG. 9 is a schematic flowchart of an audio data processing method according to an embodiment of this application. It will be appreciated that the audio data processing method may be performed by a computer device, and the computer device may be a user terminal, or a server, or a computer program application (including program codes) in a computer device, which is not specifically defined herein. As shown in FIG. 9, the audio data processing method may include S301 to S305.

S301: Acquire speech sample audio, noise sample audio, and standard sample audio, and generate sample recorded audio according to the speech sample audio, the noise sample audio, and the standard sample audio.

The computer device may acquire a large amount of speech sample audio, a large amount of noise sample audio, and a large amount of standard sample audio in advance. The speech sample audio may be an audio sequence including only human voice. For example, the speech sample audio may be pre-recorded singing sound sequences of various user, dubbing sequences of various user, or the like. The noise sample audio may be an audio sequence including only noise, and the noise sample audio may be pre-recorded noise of different scenes. For example, the noise sample audio may be various types of noise such as the whistling sound of a vehicle, the striking sound of a keyboard, and the striking sound of various metals. The standard sample audio may be pure audio stored in an audio database. For example, the standard sample audio may be a music sequence, a video dubbing sequence, or the like. In other words, the speech sample audio and the noise sample audio may be collected through recording, the standard sample audio may be pure audio stored in various platforms, and the computer device needs to acquire authorization and permission from a platform when acquiring the standard sample audio from the platform. For example, in a music recording scene, the speech sample audio may be a human voice sequence, the noise sample audio may be noise sequences of different scenes, and the standard sample audio may be a music sequence.

The computer device may superimpose the speech sample audio, the noise sample audio, and the standard sample audio to obtain sample recorded audio. To construct more sample recorded audio, not only different speech sample audio, noise sample audio, and standard sample audio may be randomly combined, but also different coefficients may be used to weight the same group of speech sample audio, noise sample audio, and standard sample audio to obtain different sample recorded audio. For example, the computer device may acquire a weighting coefficient set for a first initial network model, and the weighting coefficient set may be a group of randomly generated floating-point numbers. K arrays may be constructed according to the weighting coefficient set, each array may include three numerical values with a sort order, three numerical values with different sort orders may constitute different arrays, and three numerical values included in one array are coefficients of speech sample audio, noise sample audio, and standard sample audio, respectively. The speech sample audio, the noise sample audio, and the standard sample audio are respectively weighted according to coefficients included in a jth array in the K arrays to obtain sample recorded audio corresponding to the jth array. In other words, K different sample recorded audio may be constructed for any one speech sample audio, any one noise sample audio, and any one standard sample audio.

For example, if the K arrays include 4 arrays (in this case, K takes the value of 4), the 4 arrays are [0.1, 0.5, 0.3], [0.5, 0.6, 0.8], [0.6, 0.1, 0.4], and [1, 0.7, 0.3], respectively, and the following sample recorded audio may be constructed for speech sample audio a, noise sample audio b, and standard sample audio c: sample recorded audio y1=0.1a+0.5b+0.3c, sample recorded audio y2=0.5a+0.6b+0.8c, sample recorded audio y3=0.6a+0.1b+0.4c, and sample recorded audio y4=a+0.7b+0.3c.

S302: Acquire sample prediction speech audio from the sample recorded audio through a first initial network model, the first initial network model being configured to filter out the standard sample audio included in the sample recorded audio, and expected prediction speech audio of the first initial network model being determined according to the speech sample audio and the noise sample audio.

For all sample recorded audio used for training two initial network models (including a first initial network model and a second initial network model), the processing for each sample recorded audio in the two initial network models is the same. In a training phase, the sample recorded audio may be inputted into the first initial network model in batches, that is, all the sample recorded audio is trained in batches. For convenience of description, a process of training of the foregoing two initial network models will be described below by taking any one of all the sample recorded audio as an example.

Figure 10:
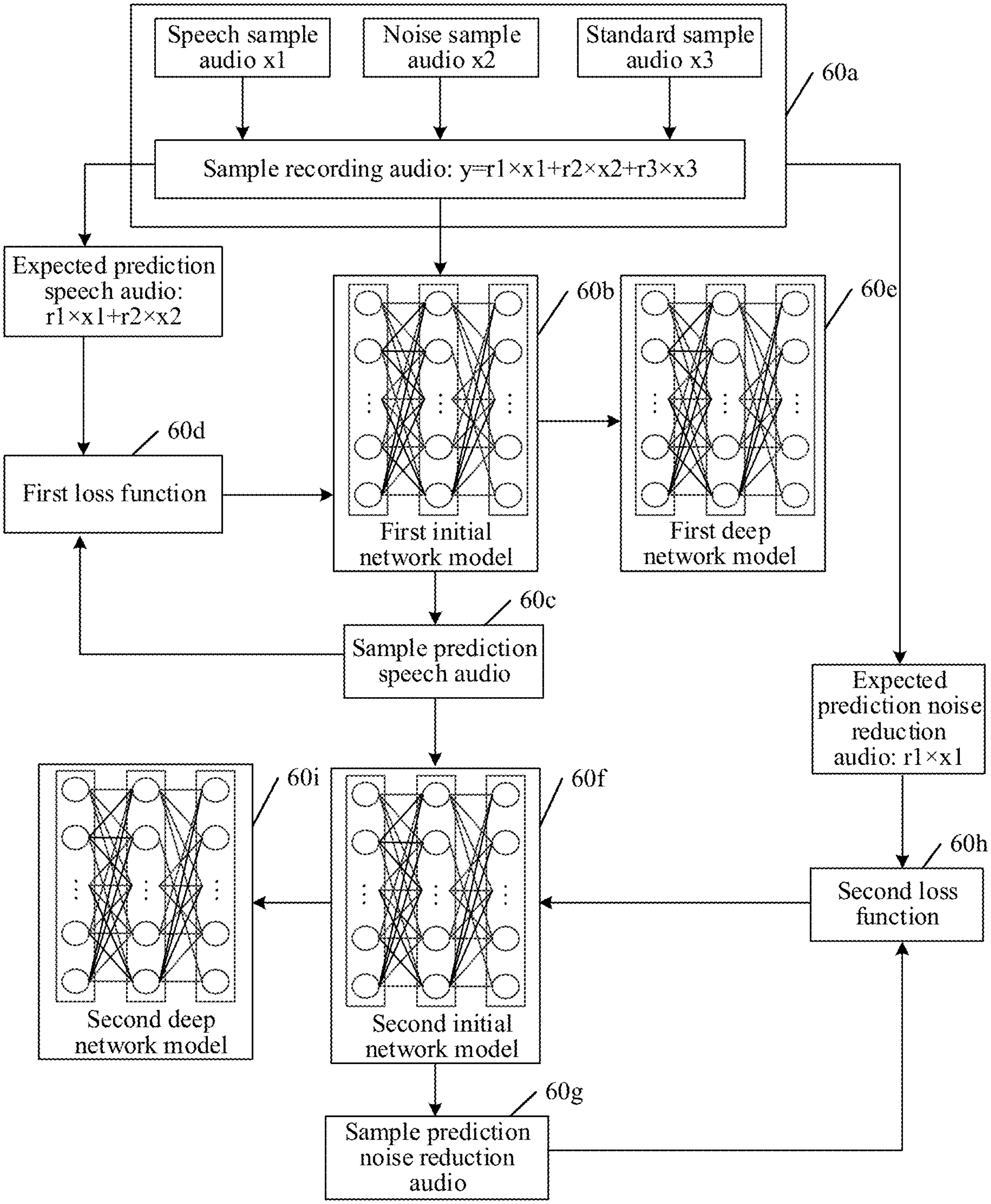
FIG. 10 is a schematic diagram of training of a deep network model according to an embodiment of this application.

Referring to FIG. 10, FIG. 10 is a schematic diagram of training of a deep network model according to an embodiment of this application. As shown in FIG. 10, sample recorded audio y may be determined according to speech sample audio x1, a noise sample audio x2, and standard sample audio in a sample database 60*a*. For example, the sample recorded audio y is equal to r1×x1+r2×x2+r3×x3. The computer device may perform frequency domain transformation on the sample recorded audio y to obtain sample power spectrum data corresponding to the sample recorded audio y, and perform normalization (such as iLN) on the sample power spectrum data to obtain a sample frequency spectrum feature corresponding to the sample recorded audio y. The sample frequency spectrum feature is inputted into a first initial network model 60*b*, and a first sample frequency point gain corresponding to the sample frequency spectrum feature may be outputted through the first initial network model 60*b*. The first sample frequency point gain may include speech gains of frequency points corresponding to the sample recorded audio, and the first sample frequency point gain here is an actual output result of the first initial network model 60*b* with respect to the foregoing sample recorded audio y. The first initial network model 60*b* may refer to a first deep network model in a training phase, and the first initial network model 60*b* is trained to filter out the standard sample audio included in the sample recorded audio.

The computer device may obtain sample prediction speech audio 60*c* according to the first sample frequency point gain and the sample power spectrum data, and a process of calculation of the sample prediction speech audio 60*c* is similar to the foregoing process of calculation of the candidate speech audio, which will not be described in detail here. Expected prediction speech audio corresponding to the first initial network model 60*b* may be determined according to the speech sample audio x1 and the noise sample audio x2, and the expected prediction speech audio may be a signal (r1×x1+r2×x2) in the foregoing sample recorded audio y. That is, an expected output result of the first initial network model 60*b* may be a result obtained by dividing each frequency point energy value (or referred to as each frequency point power spectrum value) in power spectrum data of the signal (r1×x1+r2×x2) by a corresponding frequency point energy value in the sample power spectrum data and then extracting a square root.

S303: Acquire sample prediction noise reduction audio corresponding to the sample prediction speech audio through a second initial network model, the second initial network model being configured to suppress noise sample audio included in the sample prediction speech audio, and expected prediction noise reduction audio of the second initial network model being determined according to the speech sample audio.

As shown in FIG. 10, the computer device may input the power spectrum data corresponding to the sample prediction speech audio 60*c* into a second initial network model 60*f*, and a second sample frequency point gain corresponding to the sample prediction speech audio 60*c* may be outputted through the second initial network model 60*f*. The second sample frequency point gain may include noise reduction gains of frequency points corresponding to the sample prediction speech audio 60*c*, and the second sample frequency point gain here is an actual output result of the second initial network model 60*f* with respect to the foregoing sample prediction speech audio 60*c*. The second initial network model 60*f* may refer to a second deep network model in a training phase, and the second initial network model 60*f* is trained to suppress environmental noise included in the sample prediction speech audio. A training sample of the second initial network model 60*f* need to be aligned with a partial sample of the first initial network model 60*b*. For example, the training sample of the second initial network model 60*f* may be the sample prediction speech audio 60*c* determined based on the first initial network model 60*b*.

The computer device may obtain sample prediction noise reduction audio 60*g* according to the second sample frequency point gain and the power spectrum data of the sample prediction speech audio 60*c*. A process of calculation of the sample prediction noise reduction audio 60*g* is similar to the foregoing process of calculation of the noise-reduced speech audio, which will not be described in detail here. Expected prediction noise reduction audio corresponding to the second initial network model 60*f* may be determined according to the speech sample audio x1, and the expected prediction noise reduction audio may be a signal (r1×x1) in the foregoing sample recorded audio y. That is, an expected output result of the second initial network model 60*f* may be a result obtained by dividing each frequency point energy value (or referred to as each frequency point power spectrum value) in power spectrum data of the signal (r1×x1) by a corresponding frequency point energy value in the power spectrum data of the sample prediction speech audio 60*c* and then extracting a square root.

S304: Adjust network parameters of the first initial network model based on the sample prediction speech audio and the expected prediction speech audio to obtain a first deep network model, the first deep network model being configured to filter recorded audio to obtain candidate speech audio, the recorded audio including a background reference audio component, a speech audio component, and an environmental noise component, and the candidate speech audio including the speech audio component and the environmental noise component.

As shown in FIG. 10, a first loss function 60*d* corresponding to the first initial network model 60*b* is determined according to a difference between the sample prediction speech audio 60*c* corresponding to the first initial network model 60*b* and the expected prediction speech audio (r1×x1+r2×x2), and network parameters of the first initial network model 60*b* are adjusted until the number of training iterations reaches the preset maximum number of iterations (or the training of the first initial network model 60*b* reaches convergence) by optimizing the first loss function 60*d* to a minimum value, that is, minimization of a training loss. In this case, the first initial network model 60*b* may serve as a first deep network model 60*e*, and the trained first deep network model 60*e* may be configured to filter recorded audio to obtain candidate speech audio. The use of the first deep network model 60*e* may refer to the foregoing description of S207. Optionally, the foregoing first loss function 60*d* may also be a square of the expected output result of the first initial network model 60*b* and the first frequency point gain (actual output result).

S305: Adjust network parameters of the second initial network model based on the sample prediction noise reduction audio and the expected prediction noise reduction audio to obtain a second deep network model, the second deep network model being configured to perform noise reduction on the candidate speech audio to obtain noise-reduced speech audio.

As shown in FIG. 10, a second loss function 60*h* corresponding to the second initial network model 60*f* is determined according to a difference between the sample prediction noise reduction audio 60*g* corresponding to the second initial network model 60*f* and the expected prediction speech audio (r1×x1), and network parameters of the second initial network model 60*f* are adjusted until the number of training iterations reaches the preset maximum number of iterations (or the training of the second initial network model 60*f* reaches convergence) by optimizing the second loss function 60*h* to a minimum value, that is, minimization of a training loss. In this case, the second initial network model may serve as a second deep network model 60*i*, and the trained second deep network model 60*i* may be configured to perform noise reduction on the candidate speech audio to obtain noise-reduced speech audio. The use of the second deep network model 60*i* may refer to the foregoing description of S209. In one possible implementation, the foregoing second loss function 60*h* may also be a square of the expected output result of the second initial network model 60*f* and the second frequency point gain (actual output result).

In the embodiments of this application, by weighting different coefficients for the speech sample audio, the noise sample audio, and the standard sample audio, the number of sample recorded audio can be increased, and the first initial network model and the second initial network model are trained by using the sample recorded audio, so that the generalization ability of the network models can be improved. By aligning a training sample of the second initial network model with a partial training sample (some signals included in sample recorded audio) of the first initial network model, the overall correlation between the first initial network model and the second initial network model can be enhanced, and when noise reduction is performed by using the trained first deep network model and second deep network model, a noise reduction effect on recorded audio can be improved.

Figure 11:
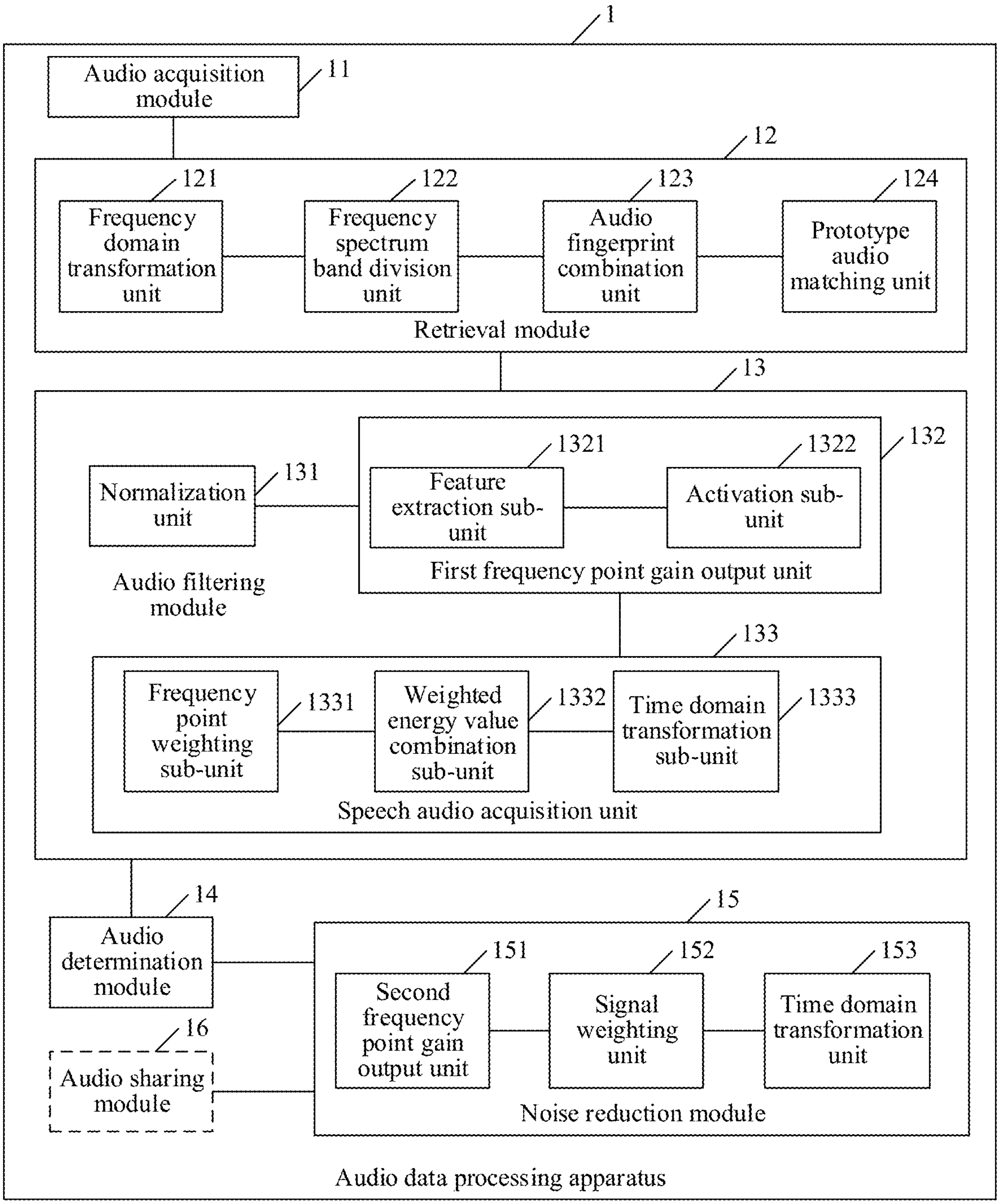
FIG. 11 is a schematic structural diagram of an audio data processing apparatus according to an embodiment of this application.

Referring to FIG. 11, FIG. 11 is a schematic structural diagram of an audio data processing apparatus according to an embodiment of this application. As shown in FIG. 11, an audio data processing apparatus 1 may include: an audio acquisition module 11, a retrieval module 12, an audio filtering module 13, an audio determination module 14, and a noise reduction module 15.

The audio acquisition module 11 is configured to acquire recorded audio, the recorded audio including a background reference audio component, a speech audio component, and an environmental noise component.

The retrieval module 12 is configured to determine prototype audio matching the recorded audio from an audio database.

The audio filtering module 13 is configured to acquire candidate speech audio from the recorded audio according to the prototype audio, the candidate speech audio including the speech audio component and the environmental noise component.

The audio determination module 14 is configured to determine a difference between the recorded audio and the candidate speech audio as the background reference audio component included in the recorded audio.

The noise reduction module 15 is configured to perform environmental noise reduction on the candidate speech audio to obtain noise reduced speech audio corresponding to the candidate speech audio, and combine the noise-reduced speech audio with the background reference audio component to obtain noise-reduced recorded audio.

Specific implementations of functions of the audio acquisition module 11, the retrieval module 12, the audio filtering module 13, the audio determination module 14, and the noise reduction module 15 may refer to S101 to S105 in the foregoing embodiment corresponding to FIG. 3, which will not be described in detail here.

In one or more embodiments, the retrieval module 12 is specifically configured to acquire an audio fingerprint corresponding to the recorded audio, and acquire prototype audio matching the recorded audio from an audio database according to the audio fingerprint to be matched.

In one or more embodiments, the retrieval module 12 may include: a frequency domain transformation unit 121, a frequency spectrum band division unit 122, an audio fingerprint combination unit 123, and a prototype audio matching unit 124.

The frequency domain transformation unit 121 is configured to divide the recorded audio into M recorded data frames, and perform frequency domain transformation on an ith recorded data frame in the M recorded data frames to obtain power spectrum data corresponding to the ith recorded data frame, i and M being both positive integers, and i being less than or equal to M.

The frequency spectrum band division unit 122 is configured to divide the power spectrum data corresponding to the ith recorded data frame into N frequency spectrum bands, and construct sub-fingerprint information corresponding to the ith recorded data frame according to peak signals in the N frequency spectrum bands, N being a positive integer.

The audio fingerprint combination unit 123 is configured to combine sub-fingerprint information respectively corresponding to the M recorded data frames according to a time sequence of the M recorded data frames in the recorded audio to obtain an audio fingerprint corresponding to the recorded audio.

The prototype audio matching unit 124 is configured to acquire an audio fingerprint library corresponding to an audio database, perform fingerprint retrieval in the audio fingerprint library according to the audio fingerprint to be matched, and determine prototype audio matching the recorded audio from the audio database according to a fingerprint retrieval result.

The prototype audio matching unit 124 is specifically configured to:

map the M pieces of sub-fingerprint information included in the audio fingerprint to be matched to M hash values to be matched, and acquire recording time respectively corresponding to the M hash values to be matched, recording time corresponding to one hash value to be matched being used for characterizing the time when sub-fingerprint information corresponding to the hash value to be matched appears in the recorded audio;

acquire a first time difference between recording time corresponding to a pth hash value to be matched and time information corresponding to a first hash value in a case that the pth hash value to be matched in the M hash values to be matched is matching the first hash value included in the audio fingerprint library, p being a positive integer less than or equal to M;

acquire a second time difference between recording time corresponding to a qth hash value to be matched and time information corresponding to a second hash value in a case that the qth hash value to be matched in the M hash values to be matched is matching the second hash value included in the audio fingerprint library, q being a positive integer less than or equal to M; and determine an audio fingerprint to which the first hash value belongs as a fingerprint retrieval result in a case that the first time difference and the second time difference satisfy a numerical threshold value, and the first hash value and the second hash value belong to the same audio fingerprint, and determine audio data corresponding to the fingerprint retrieval result as prototype audio corresponding to the recorded audio.

Specific implementations of functions of the frequency domain transformation unit 121, the frequency spectrum band division unit 122, the audio fingerprint combination unit 123, and the prototype audio matching unit 124 may refer to S202 to S205 in the foregoing embodiment corresponding to FIG. 5, which will not be described in detail here.

In one or more embodiments, the audio filtering module 13 may include: a normalization unit 131, a first frequency point gain output unit 132, and a speech audio acquisition unit 133.

The normalization unit 131 is configured to acquire recorded power spectrum data corresponding to the recorded audio, and perform normalization on the recorded power spectrum data to obtain a first frequency spectrum feature.

The foregoing normalization unit 131 is further configured to acquire prototype power spectrum data corresponding to the prototype audio, perform normalization on the prototype power spectrum data to obtain a second frequency spectrum feature, and combine the first frequency spectrum feature with the second frequency spectrum feature to obtain an input feature.

The first frequency point gain output unit 132 is configured to input the input feature into a first deep network model, and output a first frequency point gain for the recorded audio through the first deep network model.

The speech audio acquisition unit 133 is configured to acquire candidate speech audio included in the recorded audio according to the first frequency point gain and the recorded power spectrum data.

In one or more embodiments, the first frequency point gain output unit 132 may include: a feature extraction sub-unit 1321 and an activation sub-unit 1322.

The feature extraction sub-unit 1321 is configured to input the input feature into the first deep network model, and acquire a time sequence distribution feature corresponding to the input feature according to a feature extraction network layer in the first deep network model.

The activation sub-unit 1322 is configured to acquire a time sequence feature vector corresponding to the time sequence distribution feature according to a fully-connected network layer in the first deep network model, and output a first frequency point gain through an activation layer in the first deep network model according to the time sequence feature vector.

In one or more embodiments, the first frequency point gain includes speech gains respectively corresponding to T frequency points, the recorded power spectrum data includes energy values respectively corresponding to the T frequency points, and the T speech gains correspond to the T energy values in a one-to-one manner. T is a positive integer greater than 1.

The speech audio acquisition unit 133 may include: a frequency point weighting sub-unit 1331, a weighted energy value combination sub-unit 1332, and a time domain transformation sub-unit 1333.

The frequency point weighting sub-unit 1331 is configured to weight the energy values, belonging to the same frequency points, in the recorded power spectrum data according to the speech gains, respectively corresponding to the T frequency points, in the first frequency point gain to obtain weighted energy values respectively corresponding to the T frequency points.

The weighted energy value combination sub-unit 1332 is configured to determine a weighted recording frequency domain signal corresponding to the recorded audio according to the weighted energy values respectively corresponding to the T frequency points.

The time domain transformation sub-unit 1333 is configured to perform time domain transformation on the weighted recording frequency domain signal to obtain candidate speech audio included in the recorded audio.

Specific implementations of functions of the normalization unit 131, the first frequency point gain output unit 132, the speech audio acquisition unit 133, the feature extraction sub-unit 1321, the activation sub-unit 1322, the frequency point weighting sub-unit 1331, the weighted energy value combination sub-unit 1332, and the time domain transformation sub-unit 1333 may refer to S206 to S208 in the foregoing embodiment corresponding to FIG. 5, which will not be described in detail here.

In one or more embodiments, the noise reduction module 15 may include: a second frequency point gain output unit 151, a signal weighting unit 152, and a time domain transformation unit 153.

The second frequency point gain output unit 151 is configured to acquire speech power spectrum data corresponding to the candidate speech audio, input the speech power spectrum data into a second deep network model, and output a second frequency point gain for the candidate speech audio through the second deep network model.

The signal weighting unit 152 is configured to acquire a weighted speech frequency domain signal corresponding to the candidate speech audio according to the second frequency point gain and the speech power spectrum data.

The time domain transformation unit 153 is configured to perform time domain transformation on the weighted speech frequency domain signal to obtain noise-reduced speech audio corresponding to the candidate speech audio.

Specific implementations of functions of the second frequency point gain output unit 151, the signal weighting unit 152, and the time domain transformation unit 153 may refer to S209 and S210 in the foregoing embodiment corresponding to FIG. 5, which will not be described in detail here.

In one or more embodiments, the audio data processing apparatus 1 may further include: an audio sharing module 16.

The audio sharing module 16 is configured to share the noise-reduced recorded audio to a social networking system, so that a terminal device in the social networking system plays the noise-reduced recorded audio when accessing the social networking system.

A specific implementation of functions of the audio sharing module 16 may refer to S105 in the foregoing embodiment corresponding to FIG. 3, which will not be described in detail here.

In this application, the foregoing modules, units, and sub-units may implement the description of the foregoing method embodiment corresponding to any one of FIG. 3 and FIG. 5, and the beneficial effects of using the same method will not be described in detail here.

Figure 12:
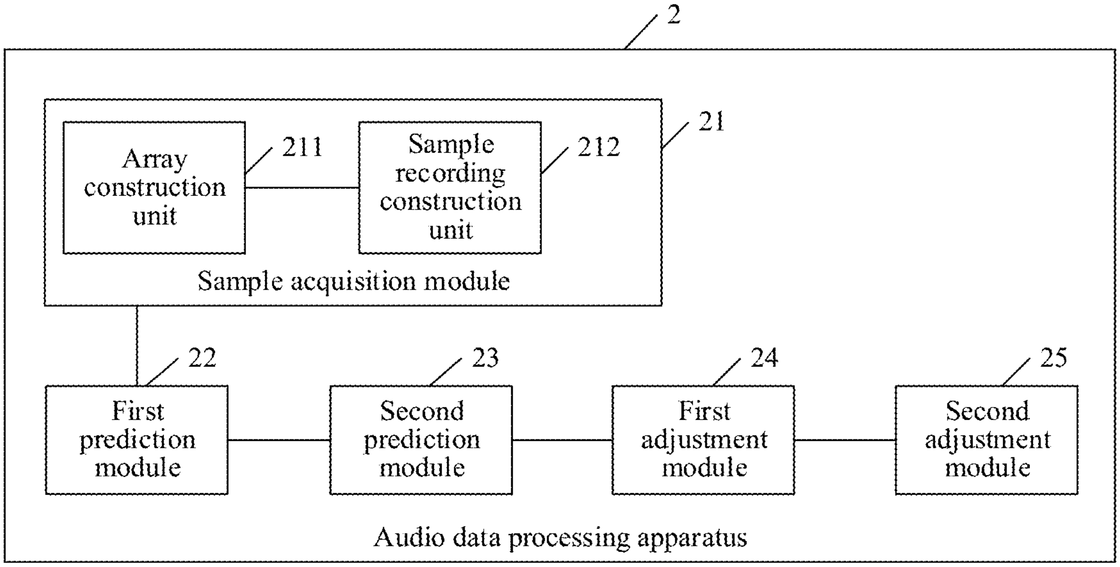
FIG. 12 is a schematic structural diagram of an audio data processing apparatus according to an embodiment of this application.

Referring to FIG. 12, FIG. 12 is a schematic structural diagram of an audio data processing apparatus according to an embodiment of this application. As shown in FIG. 12, an audio data processing apparatus 2 may include: a sample acquisition module 21, a first prediction module 22, a second prediction module 23, a first adjustment module 24, and a second adjustment module 25.

The sample acquisition module 21 is configured to acquire speech sample audio, noise sample audio, and standard sample audio, and generate sample recorded audio according to the speech sample audio, the noise sample audio, and the standard sample audio, the speech sample audio and the noise sample audio being collected through recording, and the standard sample audio being pure audio stored in an audio database.

The first prediction module 22 is configured to acquire sample prediction speech audio from the sample recorded audio through a first initial network model, the first initial network model being configured to filter out the standard sample audio included in the sample recorded audio, and expected prediction speech audio of the first initial network model being determined according to the speech sample audio and the noise sample audio.

The second prediction module 23 is configured to acquire sample prediction noise reduction audio corresponding to the sample prediction speech audio through a second initial network model, the second initial network model being configured to suppress the noise sample audio included in the sample prediction speech audio, and expected prediction noise reduction audio of the second initial network model being determined according to the speech sample audio.

The first adjustment module 24 is configured to adjust network parameters of the first initial network model based on the sample prediction speech audio and the expected prediction speech audio to obtain a first deep network model, the first deep network model being configured to filter recorded audio to obtain candidate speech audio, the recorded audio including a background reference audio component, a speech audio component, and an environmental noise component, and the candidate speech audio including the speech audio component and the environmental noise component.

The second adjustment module 25 is configured to adjust network parameters of the second initial network model based on the sample prediction noise reduction audio and the expected prediction noise reduction audio to obtain a second deep network model, the second deep network model being configured to perform noise reduction on the candidate speech audio to obtain noise-reduced speech audio.

Specific implementations of functions of the sample acquisition module 21, the first prediction module 22, the second prediction module 23, the first adjustment module 24, and the second adjustment module 25 may refer to S301 to S305 in the foregoing embodiment corresponding to FIG. 9, which will not be described in detail here.

In one or more embodiments, the number of sample recorded audio is K, and K is a positive integer.

The sample acquisition module 21 may include: an array construction unit 211 and a sample recording construction unit 212.

The array construction unit 211 is configured to acquire a weighting coefficient set for the first initial network model, and construct K arrays according to the weighting coefficient set, each array including coefficients corresponding to the speech sample audio, the noise sample audio, and the standard sample audio, respectively.

The sample recording construction unit 212 is configured to respectively weight the speech sample audio, the noise sample audio, and the standard sample audio according to coefficients included in a jth array in the K arrays to obtain sample recorded audio corresponding to the jth array, j being a positive integer less than or equal to K.

Specific implementations of functions of the array construction unit 211 and the sample recording construction unit 212 may refer to S301 in the foregoing embodiment corresponding to FIG. 9, which will not be described in detail here.

In this application, the foregoing modules, units, and sub-units may implement the description of the foregoing method embodiment corresponding to FIG. 9, and the beneficial effects of using the same method will not be described in detail here.

Figure 13:
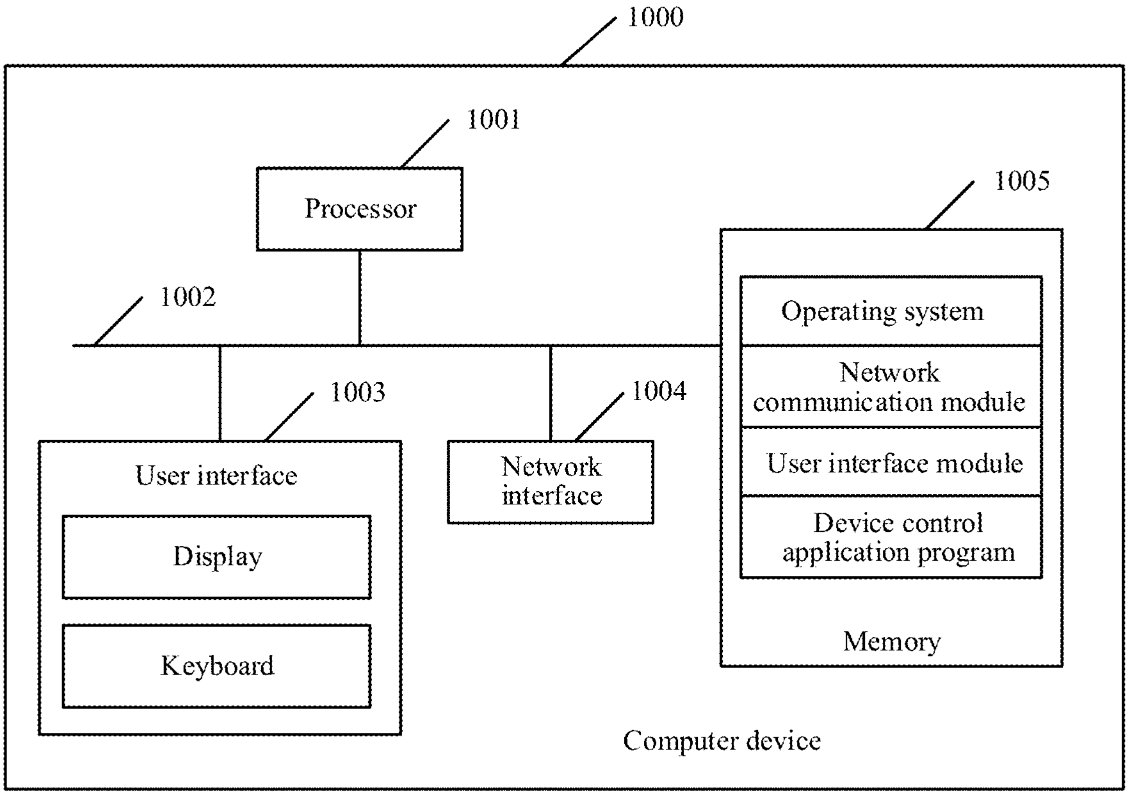
FIG. 13 is a schematic structural diagram of a computer device according to an embodiment of this application.

Referring to FIG. 13, FIG. 13 is a schematic structural diagram of a computer device according to an embodiment of this application. As shown in FIG. 13, a computer device 1000 may be a user terminal such as the user terminal 10*a* in the foregoing embodiment corresponding to FIG. 1, or a server such as the server 10*d* in the foregoing embodiment corresponding to FIG. 1, which is not defined herein. To facilitate understanding, the computer device being a user terminal is taken as an example in this application, and the computer device 1000 may include: a processor 1001, a network interface 1004, and a memory 1005. In addition, the computer device 1000 may further include: a user interface 1003 and at least one communication bus 1002. The communication bus 1002 is configured to realize connection and communication between these components. The user interface 1003 may further include standard wired interface and wireless interface. The network interface 1004 may optionally include standard wired interface and wireless interface (such as a WI-FI interface). The memory 1004 may be a high-speed random access memory (RAM), or may also be a non-volatile memory, such as at least one disk memory. The memory 1005 may optionally also be at least one storage apparatus away from the foregoing processor 1001. As shown in FIG. 13, the memory 1005, as a computer-readable storage medium, may include an operating system, a network communication module, a user interface module, and a device control application program.

The network interface 1004 in the computer device 1000 may also provide network communication functions, and the user interface 1003 may further optionally include a display and a keyboard. In the computer device 1000 shown in FIG. 13, the network interface 1004 may provide network communication functions. The user interface 1003 is mainly configured to provide an input interface for a user. The processor 1001 may be configured to invoke the device control application program stored in the memory 1005 to implement:

acquiring recorded audio, the recorded audio including a background reference audio component, a speech audio component, and an environmental noise component;

determining prototype audio matching the recorded audio from an audio database;

extracting candidate speech audio from the recorded audio according to the prototype audio, the candidate speech audio including the speech audio component and the environmental noise component;

determining a difference between the recorded audio and the candidate speech audio as the background reference audio component included in the recorded audio; and performing environmental noise reduction on the candidate speech audio to obtain noise-reduced speech audio corresponding to the candidate speech audio, and combining the noise-reduced speech audio with the background reference audio component to obtain noise-reduced recorded audio.

In some embodiments, the processor 1001 may also implement:

acquiring speech sample audio, noise sample audio, and standard sample audio, and generating sample recorded audio according to the speech sample audio, the noise sample audio, and the standard sample audio, the speech sample audio and the noise sample audio being collected through recording, and the standard sample audio being pure audio stored in an audio database;

acquiring sample prediction speech audio from the sample recorded audio through a first initial network model, the first initial network model being configured to filter out the standard sample audio included in the sample recorded audio, and expected prediction speech audio of the first initial network model being determined according to the speech sample audio and the noise sample audio;

acquiring sample prediction noise reduction audio corresponding to the sample prediction speech audio through a second initial network model, the second initial network model being configured to suppress the noise sample audio included in the sample prediction speech audio, and expected prediction noise reduction audio of the second initial network model being determined according to the speech sample audio;

adjusting network parameters of the first initial network model based on the sample prediction speech audio and the expected prediction speech audio to obtain a first deep network model, the first deep network model being configured to filter recorded audio to obtain candidate speech audio, the recorded audio including a background reference audio component, a speech audio component, and an environmental noise component, and the candidate speech audio including the speech audio component and the environmental noise component; and adjusting network parameters of the second initial network model based on the sample prediction noise reduction audio and the expected prediction noise reduction audio to obtain a second deep network model, the second deep network model being configured to perform noise reduction on the candidate speech audio to obtain noise-reduced speech audio.

It is to be understood that the computer device 1000 described in the embodiments of this application may implement the description of the audio data processing method in the foregoing embodiment corresponding to any one of FIG. 3, FIG. 5, and FIG. 9, and may also implement the description of the audio data processing apparatus 1 in the foregoing embodiment corresponding to FIG. 11, or the description of the audio data processing apparatus 2 in the foregoing embodiment corresponding to FIG. 12, which will not be described in detail here. In addition, the beneficial effects of using the same method will not be described in detail here.

In addition, it is to be pointed out here that the embodiments of this application also provide a computer-readable storage medium, which stores a computer program executed by the foregoing audio data processing apparatus 1 or audio data processing apparatus 2. The computer program includes program instructions that, when executed by a processor, are able to implement the description of the audio data processing method in the foregoing embodiment corresponding to any one of FIG. 3, FIG. 5, and FIG. 9, which will not be described in detail here. In addition, the beneficial effects of using the same method will not be described in detail here. For technical details that are not disclosed in the embodiments of the computer-readable storage medium involved in this application, reference is made to the description of the method embodiments of this application. For example, the program instructions may be deployed on a computing device for execution, or on multiple computing devices located at one site for execution, or on multiple computing devices distributed at multiple sites and interconnected through a communication network for execution. The multiple computing devices distributed at multiple sites and interconnected through a communication network may form a block chain system.

In addition, it is to be noted that: the embodiments of this application also provide a computer program product or computer program, which may include computer instructions. The computer instructions may be stored in a computer-readable storage medium. A processor of a computer device reads the computer instructions from the computer-readable storage medium, and the processor may execute the computer instructions to cause the computer device to implement the description of the audio data processing method in the foregoing embodiment corresponding to any one of FIG. 3, FIG. 5, and FIG. 9, which will not be described in detail here. In addition, the beneficial effects of using the same method will not be described in detail here. For technical details that are not disclosed in the embodiments of the computer program product or computer program involved in this application, reference is made to the description of the method embodiments of this application.

For simplicity of description, all the foregoing method embodiments are described as a series of action combinations. However, those skilled in the art will appreciate that this application is not limited by the described sequence of actions, as certain steps may be performed in other sequences or simultaneously according to this application. Furthermore, those skilled in the art will also appreciate that all the embodiments described in the specification are exemplary embodiments, and the involved actions and modules are not necessarily required by this application.

The steps in the method according to the embodiments of this application may be reordered, combined, and deleted according to actual needs.

The modules in the apparatus according to the embodiments of this application may be combined, divided, and deleted according to actual needs.

Those of ordinary skill in the art will appreciate that all or some flows of the method according to the foregoing embodiments may be implemented by a computer program instructing related hardware, the computer program may be stored in a computer-readable storage medium, and may implement the flows of the foregoing embodiments of the method when executed. The storage medium may be a magnetic disk, an optical disk, a read-only memory (ROM), a random access memory (RAM), or the like.

The above are merely exemplary embodiments of this application, and are not intended to limit the scope of the claims of this application. Therefore, equivalent variations made according to the claims of this application shall still fall within the scope of this application.

In this application, the term “unit” or “module” in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. An audio data processing method, performed by a computer device, the method comprising:

acquiring recorded audio, wherein the recorded audio includes a background reference audio component, a speech audio component, and an environmental noise component;

acquiring an audio fingerprint corresponding to the recorded audio, further comprising:

dividing the recorded audio into M recorded data frames, and performing frequency domain transformation on each of the M recorded data frames to obtain corresponding power spectrum data;

constructing sub-fingerprint information corresponding to each of the M recorded data frames according to its corresponding power spectrum data; and combining sub-fingerprint information respectively corresponding to the M recorded data frames to obtain the audio fingerprint corresponding to the recorded audio;

determining original accompaniment audio matching the background reference audio component from an audio database by submitting the audio fingerprint to the audio database;

acquiring candidate speech audio by subtracting the original accompaniment audio from the recorded audio;

extracting the background reference audio component from the recorded audio by subtracting the candidate speech from the recorded audio;

performing environmental noise reduction on the candidate speech audio to obtain noise-reduced speech audio corresponding to the candidate speech audio; and combining the noise-reduced speech audio with the background reference audio component to obtain noise-reduced recorded audio.

2. The method according to claim 1, wherein the determining of the original accompaniment audio matching the recorded audio from the audio database according to the audio fingerprint comprises:

acquiring an audio fingerprint library corresponding to the audio database;

performing fingerprint retrieval in the audio fingerprint library according to the audio fingerprint; and determining the original accompaniment audio from the audio database according to a fingerprint retrieval result.

3. The method according to claim 1, wherein the acquiring candidate speech audio by subtracting the original accompaniment audio from the recorded audio comprises:

performing normalization on recorded power spectrum data corresponding to the recorded audio to obtain a first frequency spectrum feature;

performing normalization on power spectrum data corresponding to the original accompaniment audio to obtain a second frequency spectrum feature;

inputting the first frequency spectrum feature and the second frequency spectrum feature into a first deep network model, and outputting a first frequency point gain for the recorded audio through the first deep network model; and further acquiring candidate speech audio comprised in the recorded audio according to the first frequency point gain and the recorded power spectrum data.

4. The method according to claim 1, wherein the performing environmental noise reduction on the candidate speech audio to obtain the noise-reduced speech audio corresponding to the candidate speech audio comprises:

inputting speech power spectrum data corresponding to the candidate speech audio into a second deep network model, and outputting a second frequency point gain for the candidate speech audio through the second deep network model;

acquiring a weighted speech frequency domain signal corresponding to the candidate speech audio according to the second frequency point gain and the speech power spectrum data; and performing time domain transformation on the weighted speech frequency domain signal to obtain the noise-reduced speech audio corresponding to the candidate speech audio.

5. The method according to claim 1, further comprising:

sharing the noise-reduced recorded audio on a social networking system, wherein a terminal device associated with a user of the social networking system is configured to play the noise-reduced recorded audio when accessing the social networking system.

6. A computer device, comprising a memory and a processor, the memory being connected to the processor, the memory storing a computer program that, when executed by the processor, causes the computer device to perform an audio data processing method including:

acquiring recorded audio, wherein the recorded audio includes a background reference audio component, a speech audio component, and an environmental noise component;

acquiring an audio fingerprint corresponding to the recorded audio, further comprising:

dividing the recorded audio into M recorded data frames, and performing frequency domain transformation on each of the M recorded data frames to obtain corresponding power spectrum data;

constructing sub-fingerprint information corresponding to each of the M recorded data frames according to its corresponding power spectrum data; and combining sub-fingerprint information respectively corresponding to the M recorded data frames to obtain the audio fingerprint corresponding to the recorded audio;

determining original accompaniment audio matching the background reference audio component from an audio database by querying the audio database using the audio fingerprint;

acquiring extracting candidate speech audio by subtracting the original accompaniment audio from the recorded audio;

extracting the background reference audio component from the recorded audio by subtracting the candidate speech from the recorded audio;

performing environmental noise reduction on the candidate speech audio to obtain noise-reduced speech audio corresponding to the candidate speech audio; and combining the noise-reduced speech audio with the background reference audio component to obtain noise-reduced recorded audio.

7. The computer device according to claim 6, wherein the determining of the original accompaniment audio matching the recorded audio from the audio database according to the audio fingerprint comprises:

acquiring an audio fingerprint library corresponding to the audio database;

performing fingerprint retrieval in the audio fingerprint library according to the audio fingerprint; and determining the original accompaniment audio from the audio database according to a fingerprint retrieval result.

8. The computer device according to claim 6, wherein the acquiring candidate speech audio by subtracting the original accompaniment audio from the recorded comprises:

performing normalization on recorded power spectrum data corresponding to the recorded audio to obtain a first frequency spectrum feature;

performing normalization on power spectrum data corresponding to the original accompaniment audio to obtain a second frequency spectrum feature;

inputting the first frequency spectrum feature and the second frequency spectrum feature into a first deep network model, and outputting a first frequency point gain for the recorded audio through the first deep network model; and further acquiring candidate speech audio comprised in the recorded audio according to the first frequency point gain and the recorded power spectrum data.

9. The computer device according to claim 6, wherein the performing environmental noise reduction on the candidate speech audio to obtain the noise-reduced speech audio corresponding to the candidate speech audio comprises:

inputting speech power spectrum data corresponding to the candidate speech audio into a second deep network model, and outputting a second frequency point gain for the candidate speech audio through the second deep network model;

acquiring a weighted speech frequency domain signal corresponding to the candidate speech audio according to the second frequency point gain and the speech power spectrum data; and performing time domain transformation on the weighted speech frequency domain signal to obtain the noise-reduced speech audio corresponding to the candidate speech audio.

10. The computer device according to claim 6, wherein the method further comprises:

sharing the noise-reduced recorded audio on a social networking system, wherein a terminal device associated with a user of the social networking system is configured to play the noise-reduced recorded audio when accessing the social networking system.

11. A non-transitory computer-readable storage medium, storing a computer program therein, the computer program being adapted to be loaded and executed by a processor of a computer device and causing the computer device to perform an audio data processing method including:

acquiring recorded audio, wherein the recorded audio includes a background reference audio component, a speech audio component, and an environmental noise component;

acquiring an audio fingerprint corresponding to the recorded audio, further comprising:

dividing the recorded audio into M recorded data frames, and performing frequency domain transformation on each of the M recorded data frames to obtain corresponding power spectrum data;

constructing sub-fingerprint information corresponding to each of the M recorded data frames according to its corresponding power spectrum data; and combining sub-fingerprint information respectively corresponding to the M recorded data frames to obtain the audio fingerprint corresponding to the recorded audio;

determining original accompaniment audio matching the background reference audio component from an audio database by querying the audio database using the audio fingerprint;

acquiring candidate speech audio by subtracting the original accompaniment audio from the recorded audio;

extracting the background reference audio component from the recorded audio by subtracting the candidate speech from the recorded audio;

performing environmental noise reduction on the candidate speech audio to obtain noise-reduced speech audio corresponding to the candidate speech audio; and combining the noise-reduced speech audio with the background reference audio component to obtain noise-reduced recorded audio.

12. The non-transitory computer-readable storage medium according to claim 11, wherein the acquiring candidate speech audio by subtracting the original accompaniment audio from the recorded audio comprises:

performing normalization on recorded power spectrum data corresponding to the recorded audio to obtain a first frequency spectrum feature;

performing normalization on power spectrum data corresponding to the original accompaniment audio to obtain a second frequency spectrum feature;

inputting the first frequency spectrum feature and the second frequency spectrum feature into a first deep network model, and outputting a first frequency point gain for the recorded audio through the first deep network model; and acquiring candidate speech audio comprised in the recorded audio according to the first frequency point gain and the recorded power spectrum data.

13. The non-transitory computer-readable storage medium according to claim 11, wherein the performing environmental noise reduction on the candidate speech audio to obtain the noise-reduced speech audio corresponding to the candidate speech audio comprises:

inputting speech power spectrum data corresponding to the candidate speech audio into a second deep network model, and outputting a second frequency point gain for the candidate speech audio through the second deep network model;

acquiring a weighted speech frequency domain signal corresponding to the candidate speech audio according to the second frequency point gain and the speech power spectrum data; and performing time domain transformation on the weighted speech frequency domain signal to obtain the noise-reduced speech audio corresponding to the candidate speech audio.

14. The non-transitory computer-readable storage medium according to claim 11, wherein the method further comprises:

sharing the noise-reduced recorded audio on a social networking system, wherein a terminal device associated with a user of the social networking system is configured to play the noise-reduced recorded audio when accessing the social networking system.

* * * * *